(12) United States Patent
Greenebaum

(10) Patent No.: US 8,379,039 B2
(45) Date of Patent: Feb. 19, 2013

(54) REFORMATTING CONTENT WITH PROPER COLOR-REGION CONVERSION

(75) Inventor: Kenneth Greenebaum, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 910 days.

(21) Appl. No.: 12/479,835

(22) Filed: Jun. 7, 2009

(65) Prior Publication Data

US 2010/0309217 A1 Dec. 9, 2010

(51) Int. Cl.
*G09G 5/00* (2006.01)
*G09G 5/02* (2006.01)
*H04N 17/00* (2006.01)
*H04N 5/44* (2011.01)
*H04N 1/46* (2006.01)
*G03F 3/08* (2006.01)
*G06K 9/00* (2006.01)
*G06K 9/40* (2006.01)
*G06K 9/36* (2006.01)
*H04N 5/445* (2011.01)
*H04N 5/202* (2006.01)

(52) U.S. Cl. ........ 345/589; 345/591; 345/600; 345/603; 345/606; 348/177; 348/184; 348/254; 348/553; 348/563; 358/504; 358/515; 358/519; 358/523; 358/525; 382/165; 382/167; 382/254; 382/276

(58) Field of Classification Search .................. 345/581, 345/589–591, 600, 603–606, 618–619, 204, 345/690; 348/177–184, 254, 441, 553–563, 348/569, 671; 358/504, 515, 518–519, 523–525, 358/448, 452; 382/162, 165, 167, 254, 274, 382/276

See application file for complete search history.

(56) References Cited

U.S. PATENT DOCUMENTS

| | | | |
|---|---|---|---|
| 6,091,518 A | 7/2000 | Anabuki | |
| 6,333,750 B1 * | 12/2001 | Odryna et al. | 345/629 |
| 7,400,359 B1 * | 7/2008 | Adams | 348/441 |
| 2003/0071823 A1 | 4/2003 | Fukasawa | |
| 2003/0110234 A1 * | 6/2003 | Egli et al. | 709/217 |
| 2004/0246506 A1 | 12/2004 | Hoshuyama et al. | |
| 2005/0219577 A1 * | 10/2005 | Edge | 358/1.9 |
| 2007/0008558 A1 | 1/2007 | Rumph et al. | |
| 2007/0046956 A1 * | 3/2007 | Burlingame | 358/1.2 |
| 2007/0242162 A1 * | 10/2007 | Gutta et al. | 348/645 |
| 2008/0005767 A1 * | 1/2008 | Seo | 725/62 |
| 2008/0094515 A1 * | 4/2008 | Gutta et al. | 348/602 |
| 2008/0104652 A1 * | 5/2008 | Swenson et al. | 725/118 |
| 2008/0259092 A1 | 10/2008 | Hayward | |
| 2009/0002561 A1 * | 1/2009 | Barnhoefer et al. | 348/655 |
| 2009/0018681 A1 | 1/2009 | Lee et al. | |
| 2009/0027415 A1 * | 1/2009 | Dispoto et al. | 345/604 |
| 2009/0157450 A1 * | 6/2009 | Athsani et al. | 705/7 |
| 2009/0217344 A1 * | 8/2009 | Bellwood et al. | 726/1 |
| 2010/0128976 A1 * | 5/2010 | Stauder et al. | 382/162 |
| 2011/0032365 A1 * | 2/2011 | Yett | 348/207.1 |
| 2011/0157245 A1 * | 6/2011 | Young | 345/690 |

* cited by examiner

*Primary Examiner* — Wesner Sajous
(74) *Attorney, Agent, or Firm* — Adeli & Tollen LLP

(57) ABSTRACT

Some embodiments of the invention provide several novel methods for distributing image content (e.g., picture content, video content, etc.). In some embodiments, the method tags the content with data that specifies an initial target color-region for the content. Some embodiments tag the data when the content is being created, while other embodiments tag the data when the content is being edited. The method uses the tag data to reformat the content for one or more different targets for the content. For instance, during the reformatting, some embodiments use the tags to perform proper color region conversion on the content. In some embodiments, this conversion converts the colors of each pixel in the content from the initial target color region to a subsequent target color region.

29 Claims, 20 Drawing Sheets

REFORMATTING CONTENT WITH PROPER COLOR-REGION CONVERSION

FIELD OF THE INVENTION

The invention is directed towards reformatting content with proper color region conversion.

BACKGROUND OF THE INVENTION

With the advent of digital media content, there has been a proliferation of devices that capture, create, and edit content. There has also been a proliferation of methods for distributing this content. Moreover, there has been a substantial rise in the types of devices that play back such content.

Each device for capturing, creating, editing and displaying content has a set color reproduction attributes. One such set of attributes are the color domain (called color region) of the devices. Such color domain specifies the range of colors that a device can capture or produce. Such domains are typically specified based on standards propagated by different standard organizations.

Often, content that is defined for one device is reformatted for display or output on another device. Such devices do not always have the same color regions. However, many formatting pipelines ignore this difference in the color domains, and produce content for a new device that was produced for a color region of another device.

Ignoring the color domain information while reformatting content can lead to a presentation that is stored, displayed or outputted in a format that the original author of the content did not specify. Therefore, there is a need in the art for a methodology that maintains the fidelity of a content's presentation by properly factoring color region information when reformatting content.

SUMMARY OF THE INVENTION

Some embodiments of the invention provide several novel methods for distributing image content (e.g., picture content, video content, etc.). In some embodiments, the method tags the content with data that specifies an initial target color-region for the content. Some embodiments tag the data when the content is being created, while other embodiments tag the data when the content is being edited. Accordingly, in some embodiments, the tag data is referred to as an author's intent tag in order to reflect that the data was tagged during the creation or editing of content.

The method uses the tag data to reformat the content for one or more different targets for the content. For instance, during the reformatting, some embodiments use the tags to perform proper color region conversion on the content. In some embodiments, this conversion converts the colors of each pixel in the content from the initial target color region to a subsequent target color region. Some embodiments perform this reformatting in real-time as part of a real-time viewing event, while other embodiments perform it offline as part of an off-line export operation. For example, in some embodiments, the reformatting is part of a real-time screen capture and display, while in other embodiments it is part of a content distribution system that reformats one piece of content for several different destinations.

Because the initial target color region is the source domain of the color region conversion while the subsequent target color domain is the destination domain of this operation, the discussion below refers to the initial target color region as the source color domain, and refers to the subsequent target color region as the destination color region. Content is initially created or edited for the source color region. The source color region can be the color region of a particular content standard (e.g., picture standard, video standard), a particular display device (e.g., a monitor), a particular output device (e.g., a printer), a particular image capture device, or any other source color region. Similarly, the destination color region to which the content is reformatted can be the color region of a particular content standard, a particular display device, a particular output device, or any other destination color region. Each standard, device, or other domain can have its own unique color region, which specifies the colors that are available in that standard, device or domain.

Some embodiments provide a method for testing the color transformation operations of the formatting pipeline that is used to reformat content. For instance, some embodiments provide novel test methods that use existing standard test equipment with modifications of existing test patterns that are used with such equipment. Such test patterns are commonly provided with content to test the accuracy of color formatting operations that are to be performed on content.

In some embodiments, the method selects a test pattern that is used with standard test equipment to test the viability of content reformatting operations in a first color region. The method then modifies this test pattern so that it can be used to test the viability of content reformatting operations that are at least partially performed in a second color region. The method then uses this modified test pattern to the accuracy of content-reformatting operations that reformat the color of the content from the first color region to the second color region.

Other embodiments use alternative methods for testing the accuracy of reformatting operations that reformat content between two different color regions. For instance, the method of some embodiments intersects the color gamuts that represent the two different color regions. The method then selects several colors that lie on the intersection boundary of the two gamuts, or lie within the intersection boundary of the two gamuts. The method uses these selected colors to generate a color test pattern, which it then uses to verify the accuracy of the content-reformatting operations that reformat content between the two different color regions.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
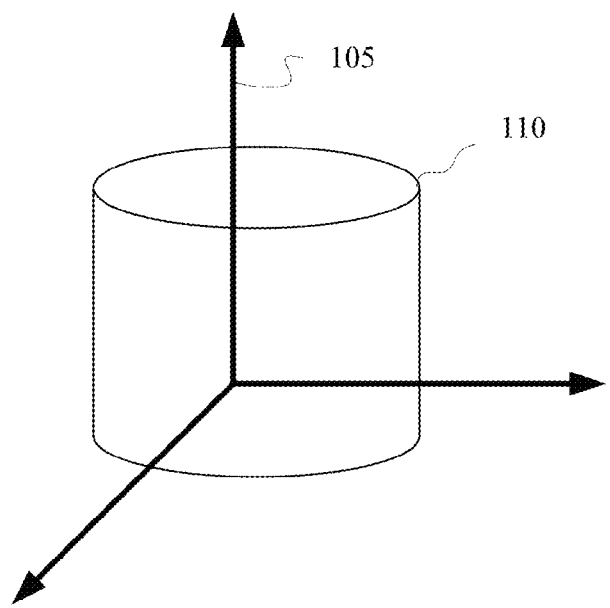
FIG. 1 presents a diagram that illustrates the difference between color region and color coordinate system.

In the following description, numerous details are set forth for purpose of explanation. However, one of ordinary skill in the art will realize that the invention may be practiced without the use of these specific details.

Some embodiments of the invention provide several novel methods for distributing image content (e.g., picture content, video content, etc.). In some embodiments, the method tags the content with data that specifies an initial target color-region for the content. Some embodiments tag the data when the content is being created, while other embodiments tag the data when the content is being edited. Accordingly, in some embodiments, the tag data is referred to as an author's intent tag in order to reflect that the data was tagged during the creation or editing of content.

The method uses the tag data to reformat the content for one or more different targets for the content. For instance, during the reformatting, some embodiments use the tags to perform proper color region conversion on the content. In some embodiments, this conversion converts the colors of each pixel in the content from the initial target color region to a subsequent target color region. Because the initial target color region is the source domain of the color region conversion while the subsequent target color domain is the destination domain of this operation, the discussion below refers to the initial target color region as the source color domain, and refers to the subsequent target color region as the destination color region.

Some embodiments perform this reformatting in real-time as part of a real-time viewing event, while other embodiments perform it offline as part of an off-line export operation. For example, in some embodiments, the reformatting is part of a real-time screen capture and display, while in other embodiments it is part of a content distribution system that reformats one piece of content for several different destinations.

Content is initially created or edited for a source color region, which can be the color region of a particular content standard (e.g., picture standard, video standard), a particular display device (e.g., a monitor), a particular output device (e.g., a printer), a particular image capture device, or any other source color region. Similarly, the destination color region to which the content is reformatted can be the color region of a particular content standard, a particular display device, a particular output device, or any other destination color region. Each standard, device, or other domain can have its own unique color region, which specifies the colors that are available in that standard, device or domain.

Some embodiments provide a method for testing the color transformation operations of the formatting pipeline that is used to reformat content. For instance, some embodiments provide novel test methods that use existing standard test equipment with modifications of existing test patterns that are used with such equipment. Such test patterns are commonly provided with content to test the accuracy of color formatting operations that are to be performed on content.

In some embodiments, the method selects a test pattern that is used with standard test equipment to test the viability of content reformatting operations in a first color region. The method then modifies this test pattern so that it can be used to test the viability of content reformatting operations that are at least partially performed in a second color region. The method then uses this modified test pattern to test the accuracy of content-reformatting operations that reformat the color of the content from the first color region to the second color region.

Other embodiments use alternative methods for testing the accuracy of reformatting operations that reformat content between two different color regions. For instance, the method of some embodiments intersects the color gamuts that represent the two different color regions. The method then selects several colors that lie on the intersection boundary of the two gamuts, or lie within the intersection boundary of the two gamuts. The method uses these selected colors to generate a color test pattern, which it then uses to verify the accuracy of the content-reformatting operations that reformat content between the two different color regions.

Several more detailed examples of the testing methodology of some embodiments will be described below in Section IV. However, before describing these methodologies, Section I provides definitions of several terms that are used throughout this document. Section II then describes one authoring environment that affixes tags to created and/or edited content to specify the color region for which an author creates and/or edits content. Section II also describes content distribution systems that utilize such tags to reformat one piece of content for multiple different destinations. Section III then describes another environment that in real-time (1) associates one or more tags to content that is captured from a display screen of a device, and (2) uses such tags to perform the correct color region conversion while reformatting the content. Section IV provides two different test methodologies that can be used for the media-editing application and screen-capture application.

Section V describes a computer system for implementing some embodiments of the invention. Finally, Section VI describes a distribution network of some embodiments of the invention.

I. Definitions

Two terms used in this document are color region and color coordinate system. FIG. 1 presents a diagram that illustrates the difference between these two terms. Specifically, this figure illustrates a three-axis coordinate system 105 and a color region 110 that is defined in this coordinate system.

In this figure, the coordinate system 105 is a Cartesian color coordinate system that can be used to define a color region for a particular image, a particular device, a particular standard, etc. Non-Cartesian coordinate systems can also be used to define a color region. Color coordinate system are often, but not always, expressed in terms of three or four elements. For some color coordinate systems, these elements are often referred to as primary color channels. Examples of color coordinate systems include (1) Red, Green, and Blue (RGB) coordinate system, (2) luminance-chrominance coordinate system, such as YUV, YCbCr, etc., (3) L,a,b coordinate system, (4) HSV coordinate system, (5) device-independent X, Y, Z coordinate system, etc.

In FIG. 1, the color region 110 represents a region of colors that are available in a particular standard, are producible by a particular capture, output or display device, are part of an image, etc. Such a region is referred to as the color region in this document. Such a region is sometimes referred to as a color space in other literature. However, as the term color space is at times confused with the color coordinate system, this document uses the term color region instead of color space.

A color region can be defined by reference to any coordinate system. Color coordinate system conversion refers to a transform operation that transforms a description of content from one color coordinate system (e.g., YUV) to another color coordinate system (e.g., RGB). For instance, when content is transformed from an RGB color coordinate system to a YCbCr color coordinate system, the representation of the color values of each pixel changes from an RGB representation (i.e., a representation that expresses the color of each pixel in terms of one red value, one green value and one blue value) to a YCbCr representation (i.e., a representation that expresses the color of each pixel in terms of one luminance value Y and two chrominance values Cb and Cr.) Typically, color coordinate system transformations are lossless operations.

Color region conversion, on the other hand, refers to a transform operation that transforms the color values of the content from one color region (e.g., a color region defined by a rec. 709 high-definition video standard) to another color region (e.g., a color region defined by a rec. 601 standard-definition video standard). For instance, when content is transformed from a rec. 709 high definition standard to a rec. 601 standard definition, a color region transform operation is performed on the content in order to change each color value of each pixel from a rec. 709 value to a rec. 601 value. The color transform that is applied to the content is a transform that is designed to transform the rec. 709 color region into the rec. 601 color region. Some embodiments identify such a transform by (1) identifying the set of operations that would scale, move, rotate and/or otherwise adjust a first color region (e.g., the rec. 709 color region) to become a second color region (e.g., the rec. 601 region), and (2) embedding these operations in a matrix form. These operations are designed to adjust the first color region to fit in the second color region with minimal amount of data loss from the first color region. However, color region conversions are often lossy operations as their associated adjustment operations may not be able to convert a first color region into a second color region without losing part of the first color region.

Some embodiments perform the color conversion operation in device-independent X, Y, Z color coordinate system. Specifically, when the input content to the color region conversion is defined initially in terms of another coordinate system (e.g., an RGB coordinate system), these embodiment first transform the content's color description from the other coordinate system to the X, Y, Z coordinate system. These embodiments then perform the color region conversion. After performing this color region conversion, these embodiments transform the content from the X, Y, Z coordinate system back to the other coordinate system (e.g., back to the RGB coordinate system). Some embodiments combine one or more of matrices that perform the transforms that occur during the color region conversion (e.g., a transform matrix for converting content into the X, Y, Z system and a transform matrix for performing the color region conversion) into one transform matrix.

Figure 2:
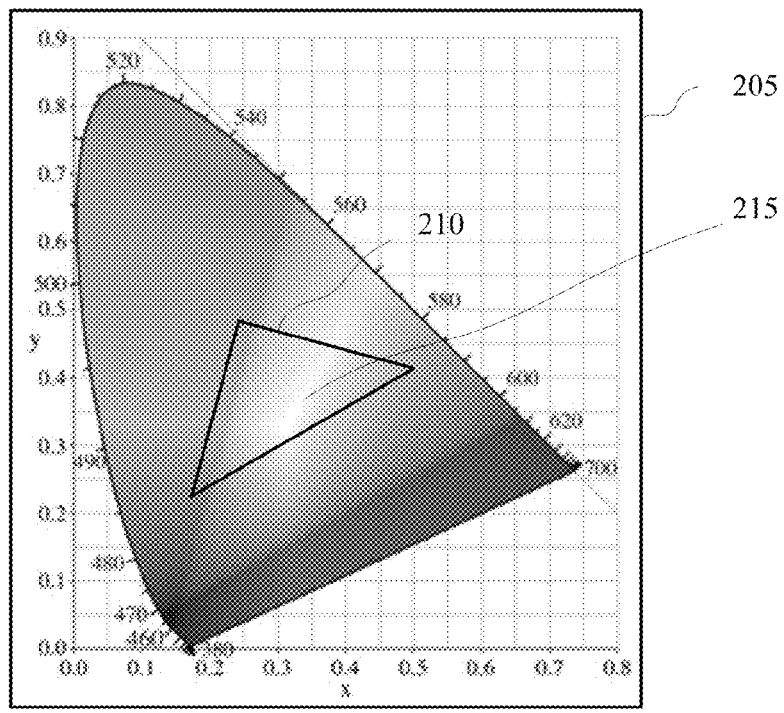
FIG. 2 presents another manner of illustrating the colors that are available in a particular circumstance.

FIG. 2 presents another manner of illustrating the colors that are available in a particular circumstance. This figure shows a traditional CIE diagram 205 (more accurately referred to as a "CIE 1931 Color Space" diagram). A triangular region 210 within this diagram represents a particular color region of available colors, i.e., the range of colors that are available in a particular circumstance (e.g., are available for display by a particular display device, are reproducible by a particular image capture device, are available for reproduction by a particular output device, are prescribed by a particular standard, etc.). This triangular region is referred to as the gamut.

The three vertices of the triangular region 210 are the base non-white colors points that define the color triangular region 210. These three base non-white color points are often the most saturated base color points that are available in the particular circumstance that is depicted by the CIE diagram. The three base non-white colors are often referred to as the three primary colors. Some embodiments express a color region in terms of the three primary colors along with a white point, which is a point inside the triangularly represented color region that is designated as the white point in the gamut. The point 215 is the white point in the example that is illustrated in FIG. 2. From the location of the white point, some embodiments generate weighting values to use to combine the primary colors to represent the "whitest" value for the color region.

II. Media Editing Environment

A. Authoring

Figure 3:
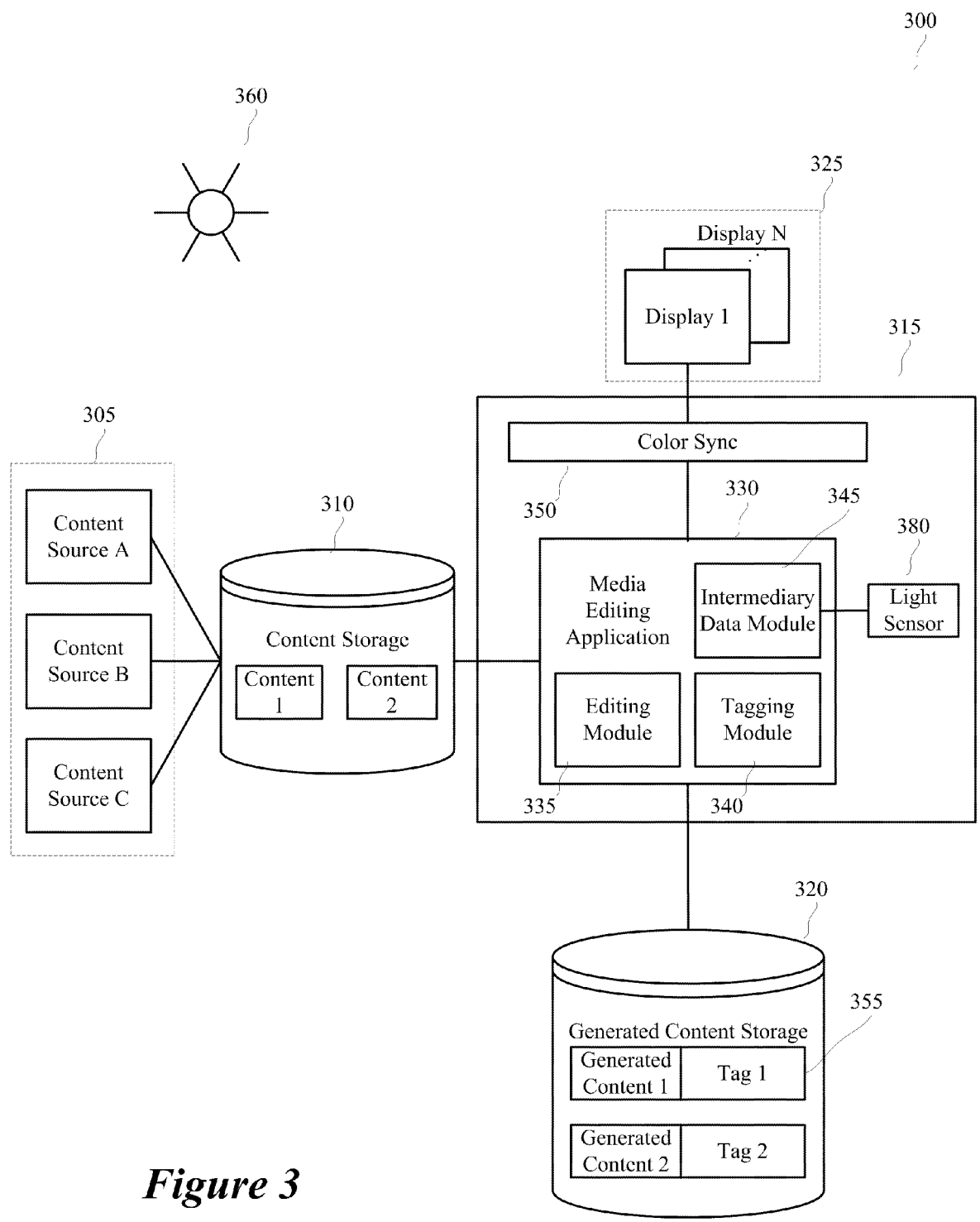
FIG. 3 presents a media-editing environment that creates and edits content.

As mentioned above, one application for the color-region tagging and conversion of some embodiments is in the field of content creation and editing. To illustrate one such use, FIG. 3 presents a media-editing environment 300 that creates and edits content. As shown in this figure, this environment includes various content sources 305, one or more content storages 310, a computer system 315, one or more edited content storages 320, one or more displays 325, and a light sensor 380 (e.g., an ambient light sensor for sensing natural and/or artificial light). This figure also illustrates that the content creation and editing is performed in an environment that has a particular ambient light characteristic 360, which may be the result of either natural light source or an artificial light source.

The various different content sources 305 provide various pieces of content that are stored in the content storage 310. The different content sources 305 include various different distributors of content, such as movie studios, record labels, TV stations, large and small independent content developers, individuals, etc. Different content sources 305 distribute their content through different distribution channels, such as through the broadcast, cable, or satellite TV, through distributable media (such as CDs and DVDs), through the Internet or other private or public push or pull data network, etc. Examples of content include pictures, video clips, audio clip, movies, shows, songs, albums, and other audio, graphical, textual, or video content, etc.

In some embodiments, the content storage 310 is completely or partially part of the computer system 315. In other embodiments, this storage is separate from the computer system but communicatively coupled to it. The media editing application 330 allows its users to retrieve content from the content storage 310. A user can then use the media editing application 330 to edit the retrieved content and/or to create new composite content with the retrieved content. According to some embodiments of the invention, the media editing application 330 also allows the edited and/or created content (collectively referred to below as "generated content") to be tagged with metadata that specifies the expressed or implied color region for the generated content.

To facilitate its editing and tagging operations, the media editing application 315 includes an editing module 335, a tagging module 340, and an intermediary data module 345, as shown in FIG. 3. The editing module 335 collectively represents several different editing processes and user-interface tools for facilitating user interaction with such processes. In some embodiments, the media editing application is one of the media editing applications that can be found in the market today, and the editing module 335 is the editing engine and tools of one of these applications. Several such media editing applications that are provided by Apple Inc.® include iMovie®, Final Cut Pro®, Motion®, Shake®, iPhoto®, etc. However, many other media editing applications from many other vendors exist today and the media editing application can be any one of those other applications.

The tagging module 340 is the module that (1) tags the content generated by the media editing application 330 with metadata that specifies the expressed or implied color region for the generated content, and (2) stores the generated and tagged content 355 in the generated content storage 320. In some embodiments, the tagging module only tags the generated content with metadata that specifies the expressed or implied intent of the author (i.e., the application's user who generates the content) regarding the color region of the generated content. However, instead of, or in conjunction with, the tagging of the content to reflect the author's expressed or implied intent regarding the color region of the generated content, the tagging module of some embodiments tags the content with data that specifies the color region that the author perceived while generating the content, as further described below.

Different embodiments use different methodologies to tag content with the author's intent regarding the color region. In some embodiments, the tagging module 340 specifies the tag based on the author's expressed input regarding the color region towards which the author is generated the content. For instance, in one scenario, the author expressly inputs the rec. 601 standard definition's color region as the target color region for the generated content. In another scenario, the author might not input rec. 601 standard definition as the target output of the generated content. For example, the tagging module of some embodiments might imply the rec. 601 standard definition color region for a new compositing project when the author specifies that the project is meant to produce a DVD and the editing application only produces standard definition content for DVDs.

Figure 4:
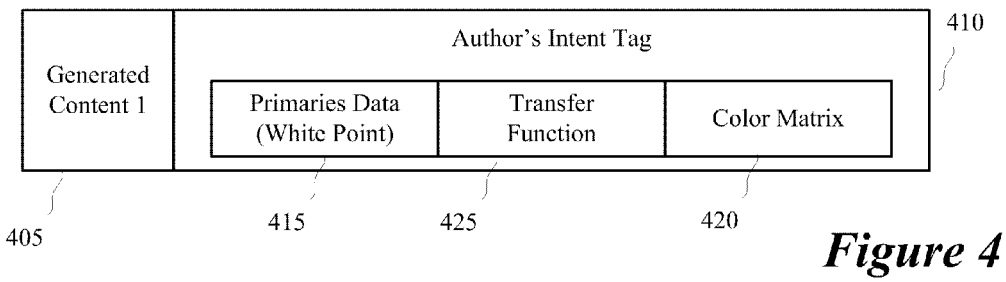
FIG. 4 illustrates that in some embodiments an NCLC tag expresses three parameters.

In the context of video editing, the tagging module of some embodiments use NCLC (nonconstant luminance coding) tags to specify the author's expressed or implied intent as to the color region. FIG. 4 illustrates that in some embodiments an NCLC tag expresses three parameters. Specifically, it illustrates one piece of edited content 405 that is tagged with an NCLC tag 410 that expresses an author's intent. One parameter 415 specifies an index that can be used to identify primary colors of the color gamut (i.e., the three vertices of the gamut triangular region) of the color region specified by the NCLC tag. The derivation of these primary colors from such an index is based on known techniques in the art.

Another parameter 420 specifies an index that identifies a color matrix, which for transforming content data from one color coordinate system to another color coordinate system. Video data is often generated by editing applications in the YCbCr coordinate system. However, certain image formatting operations (such as scaling, compositing, etc.) are typically performed in RGB space. Accordingly, in some embodiments, the color matrix is provided to transform YCbCr content data to RGB content data. The transformation operation will be further described below.

The third parameter 425 is an index that identifies a transfer function that is used during the color region conversion. Color region conversion is typically performed in linear space. However, the input to the color region conversion is typically in a non-linear domain. Accordingly, in some embodiments, the inverse of the transfer function is used to convert the input to the color region conversion into linear domain. As further described below, the input to the color region conversion is the profile of the source color region towards which the author generated the content. This profile is referred to as the source profile. The color region conversion converts content pixel color values from the source color region to pixel color values in the destination color region.

In the context of media editing applications, the tagging module 340 of some embodiments only tags the generated content with NCLC tags. Other embodiments tag the generated content with other tags in conjunction or in lieu of the NLCL tags. For instance, as mentioned above, the tagging module of some embodiments tags the content with data that specifies the color region that the author perceived while generating the content.

The author's perception of the color can be affected by a variety of factors. Two such factors are the lighting conditions under which the author performed his edits and the display on which the author performed his edits. To capture and provide data regarding the lighting conditions 360, the media editing application includes the intermediary data module 345. This module in conjunction with light sensor 380 operates to detect lighting conditions 360. In some embodiments, the light sensor 380 is a sensor that is provided with the computer to adjust keyboard and display lighting in different lighting conditions.

Based on the detected lighting conditions, the intermediary data module 345 generates data regarding the lighting conditions, and passes this data to the tagging module to tag the content with intermediary tag data. It is useful to tag such lighting conditions as such conditions affect the user's perception of colors. For instance, in a very dim room, a user may perceive the colors in the content as being very flat and hence the computer may boost the gamma of (e.g., to enhance contrast in) the content in such circumstances. Accordingly, it is useful to know such conditions, in order to adjust the color region to match the colors that the user perceived.

Different devices may affect the author's perception of the content's color as different display devices have different color regions. For instance, the author would see the colors of a content that is being targeted towards a particular color region of a particular standard differently on a standard computer monitor than on a high-end broadcast monitor. Accordingly, in some embodiments, the tagging module identifies the monitor that the author uses during the generation of the content and includes data regarding this monitor in the tag metadata. In some embodiments, such tag metadata takes the form of specifying the ICC profile for the monitor (e.g., by using a PROF tag that contains the ICC profile of the monitor, or an NCLC tag, if available, in cases where the content is video).

On the other hand, the tagging module 340 of some embodiments does not include the profile of the monitor in the tag metadata. In some embodiments, the tagging module does not do this because the computer system 315 includes a color sync module 350 that accounts for the author's perception of the color space on the display device. The color sync module 350 performs a color match operation to match the color region of the source to the display's color region. In some embodiments, the color sync module is the module used in computers provided by Apple Inc. for performing color match operations to display video in real-time on display devices of computers or devices connected to computers.

In some embodiments, the tagging module does not include the monitor's profile in the tag metadata, because it is assumed that the author's intent is not best expressed in terms of the content displayed on a display monitor 325. Instead, these embodiments assume that the author's intent is best captured from the author's express input, or implied input based on choices made by the author. In other words, these embodiments assume that the correct expression of the content for the source color region is the pixel data that is stored in a pixel buffer (not shown), before it is color converted by the color sync module 350 for display on the display devices 325. In these circumstances, the authoring is being done towards the pixel buffer and not towards the display.

However, in some embodiments, the computer 315 does not perform color matching operations (i.e., does not have a color sync module to color convert between the source color region and a display's color region). In some such embodiments, the tagging module does include the profile of the display that the author uses to review the generated content. As mentioned above, some embodiments express the profile of a display by using (1) especially in cases where the content is video, the NCLC tag (if available) that corresponds to the monitor ICC profile, or (2) the PROF tag that contains the monitor's ICC profile.

B. Content Formatting Pipeline

Figure 5:
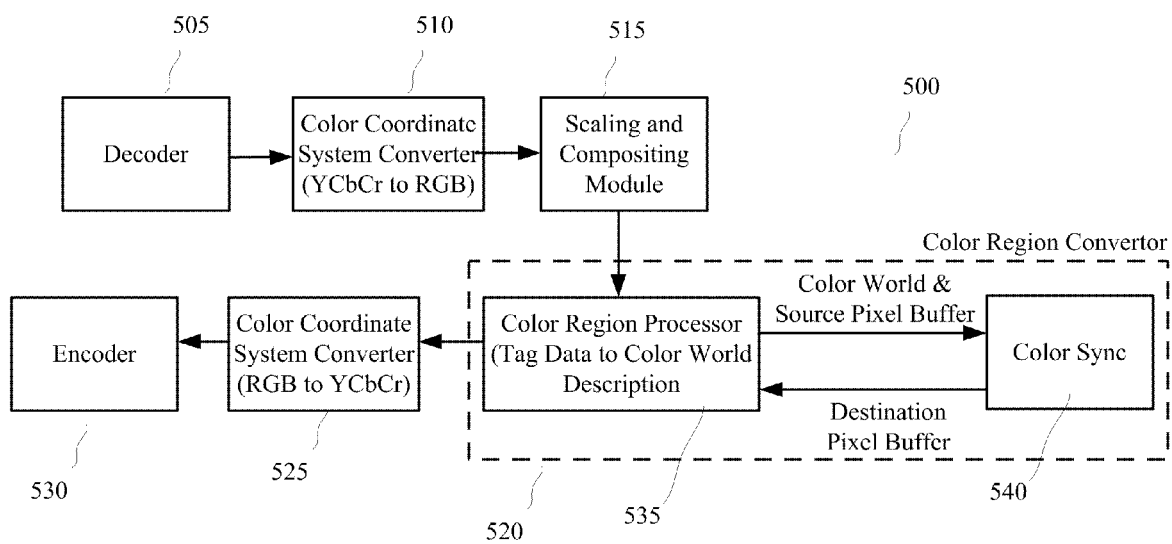
FIG. 5 illustrates an example of a formatting pipeline that is used in some embodiments to re-format video content that is generated by the media editing application.

FIG. 5 illustrates an example of a formatting pipeline 500 that is used in some embodiments to re-format video content that is generated by the media editing application 330. Among other operations, this formatting pipeline performs a series of operations that (1) take compressed video content defined with respect to one color region, and (2) produce compressed video content that is defined for another color region. As shown in FIG. 5, the formatting pipeline includes a decoder 505, a color coordinate system converter 510, a scaling and compositing module 515, a color-region converter 520, another color coordinate system converter 525, and an encoder 530. The color-region converter 520 is formed by two modules, a color-region processor 535 and a color sync module 540. In some embodiments, the module for implementing each of the stages 505 to 540 in the formatting pipeline 500 is implemented as one or more software processes on one or more computers or computing devices. This is also the case for the implementation of other stages in other formatting pipelines illustrated in other figures described below.

In the discussion below, each of the components of the formatting pipeline 500 will be described by reference to an example where the pipeline receives compressed rec. 709 high-definition video content and produces rec. 601 standard-definition video content. However, one of ordinary skill will realize that this pipeline can be used to reformat content between any two different color regions. Moreover, one of ordinary skill will realize that this pipeline can have fewer or additional components depending on the particular pair of color regions between which it transform content.

In some embodiments, the decoder 505 of FIG. 5 receives encoded (i.e., compressed) YCbCr video content data that is defined in the color region of the rec. 709 high-definition video standard. The received video content can be encoded in any one of the traditional encoding formats (e.g., H264, etc.). The decoder 505 decodes the received content to produce decompressed rec. 709 high-definition video content. In some embodiments, the decoder 505 uses standard decoding processes for decoding the received video content.

The color coordinate system converter 510 receives the decompressed YCbCr video data. It transforms this data to decompressed RGB video data. In some embodiments, the converter 510 uses a color matrix transform to transform the decompressed video data from one color coordinate system to another color coordinate system. The color matrix transform the converter 510 uses in some embodiments is the color matrix 420 that is identified in the NCLC tag 410.

The color coordinate system is converted from YCbCr to RGB in some embodiments, because scaling and compositing operations may need to be performed to transform HD content to SD content, and such operations typically can be optimally performed in RGB color coordinate system. Accordingly, the coordinate system converter 510 provides the decompressed video data in RGB format to the scaling and compositing module 505. This module, in turn, scales the video content (i.e., reduces the size of the image). It also performs a compositing operation on the video content. Examples of compositing operations include the addition of closed caption data, channel logo data, etc.

The result of the scaling and compositing operation is provided to the color-region converter 520, which performs a color region transformation on this data. Specifically, according to some embodiments of the invention, the color-region converter 520 transforms the scaled and composited RGB data that it receives from the rec. 709 color region to a rec. 601 color region.

To do this, the color-region converter 520 of some embodiments uses two modules as illustrated in FIG. 5. These two modules are the color-region processor 535 and the color sync module 540. The color-region processor 535 converts the tag data that accompanies the video content received by the decoder. It converts this data into a color world description that describes the parameters for performing a color-region transform operation (referred to as a color match operation). Specifically, the color world specifies (1) the color region of the received video content (i.e., the source color region), and (2) the color region of the video content after the color region conversion. The received video content's color region is referred to as the source color region, while the color region after the color region conversion is referred to as the destination color region.

Figure 6:
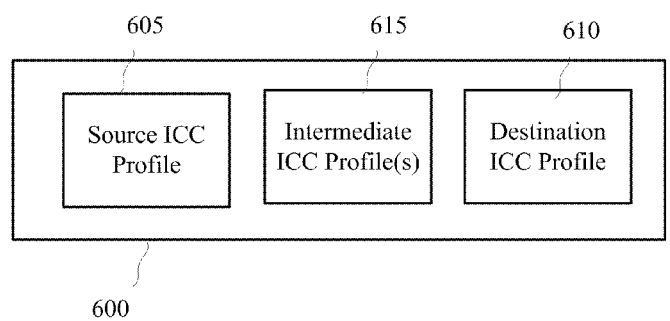
FIG. 6 illustrates a color world description used in some embodiments.

FIG. 6 illustrates that the color-region processor 535 specifies the color world description 600 in some embodiments in terms of at least two ICC profiles in some embodiments. These ICC profiles are (1) a source ICC profile 605 that describes the source color region, and (2) a destination ICC profile 610 that describes the destination color region. When the tag data includes intermediary data (e.g., data regarding lighting conditions), the color-region processor 535 of some embodiments also includes intermediate ICC profiles 615 in the color world description 600.

As shown in FIG. 5, the color-region processor 535 provides the color world description to the color sync module 540. It provides this description along with a source pixel buffer for each source video picture (e.g., each video frame or field) that it wants the color sync module 540 to color match.

The color sync module 540 performs a color match operation on each source pixel buffer that it receives, based on the color world description that it receives. In some embodiments, the color sync module is a color matching framework provided by Apple Inc. This framework can perform the color match operation on a source pixel buffer that it receives, or it can provide the parameters of transfer functions that a processor (e.g., a graphics processor, called GPU below) performs on this data. In some embodiments, the color sync module (1) performs the color match operation when it is being used to transform video content that is defined for a first color region to video content that is defined for a second color region, and (2) returns parameters for allowing a processor to perform the color match operation when it is being used for color region conversion during a real-time screen capture operation. The latter situation will be further described below by reference to FIG. 12-14.

Given that the example illustrated in FIG. 5 relates to the transform of video content from one color region to another, the color sync 540 performs a color match operation on each source pixel buffer that it receives, and supplies a destination pixel buffer for each source pixel buffer to the color-region processor 535. For instance, when content is transformed from a rec. 709 high definition standard to a rec. 601 standard definition, the color sync 540 performs a color region transform operation on each pixel in the source pixel buffer to changes each color value of the pixel from a rec. 709 value to a rec. 601 value. In other word, each destination pixel buffer specifies a video picture (e.g., a video frame or field) that is defined in the destination color region, which in this example is the color region of the rec. 601 standard. In some cases, each destination pixel buffer contains two video fields of data when the destination video picture is in an interlaced format.

In some embodiments, the color sync 540 performs the color conversion operation in device-independent X, Y, Z color coordinate system. Specifically, when this module receives the pixel buffer data from the processor 535, it receives this data in an RGB format. Accordingly, in some embodiments, the color sync 540 first transforms each pixel's color description from the RGB coordinate system to the X, Y, Z coordinate system. It then performs the color region conversion, and after performing this color region conversion, transforms the content from the X, Y, Z coordinate system back to the RGB coordinate system. In some embodiments, the color sync 540 combines one or more of matrices that perform the transforms that occur during the color region conversion (e.g., the transform matrix for converting content into the X, Y, Z system and the transform matrix for performing the color region conversion) into one transform matrix.

As mentioned above, color sync 540 supplies each color-region converted destination pixel buffer to the color-region processor 535. This processor takes the color matched video content (i.e., the destination pixel buffer data) that it receives from the color sync module, and supplies this content to the color coordinate system converter 525. The converter 525 receives the video content data in the RGB space (i.e., the destination pixel buffer data that the converter receives is RGB data expressed in terms of an RGB coordinate system).

The coordinate system converter 525 converts the RGB data that it receives to YCbCr data. In some embodiments, the converter 525 performs this conversion by using the inverse of the color matrix transform that it used at 510 to transform YCbCr data to RGB data. The converter 525 converts the video data to YCbCr coordinate system because video is typically defined in this coordinate system.

The converter 525 supplies the decompressed YCbCr video data to the encoder 530. The encoder, in turn, encodes the received video data. This encoder encodes the video data to produce compressed rec. 601 standard-definition video content. In some embodiments, the encoder 530 uses standard encoding processes for encoding the video content that it receives in order to encode the received video content into any one of the traditional encoding formats (e.g., H264, etc.).

C. Color Distribution System

Figure 7:
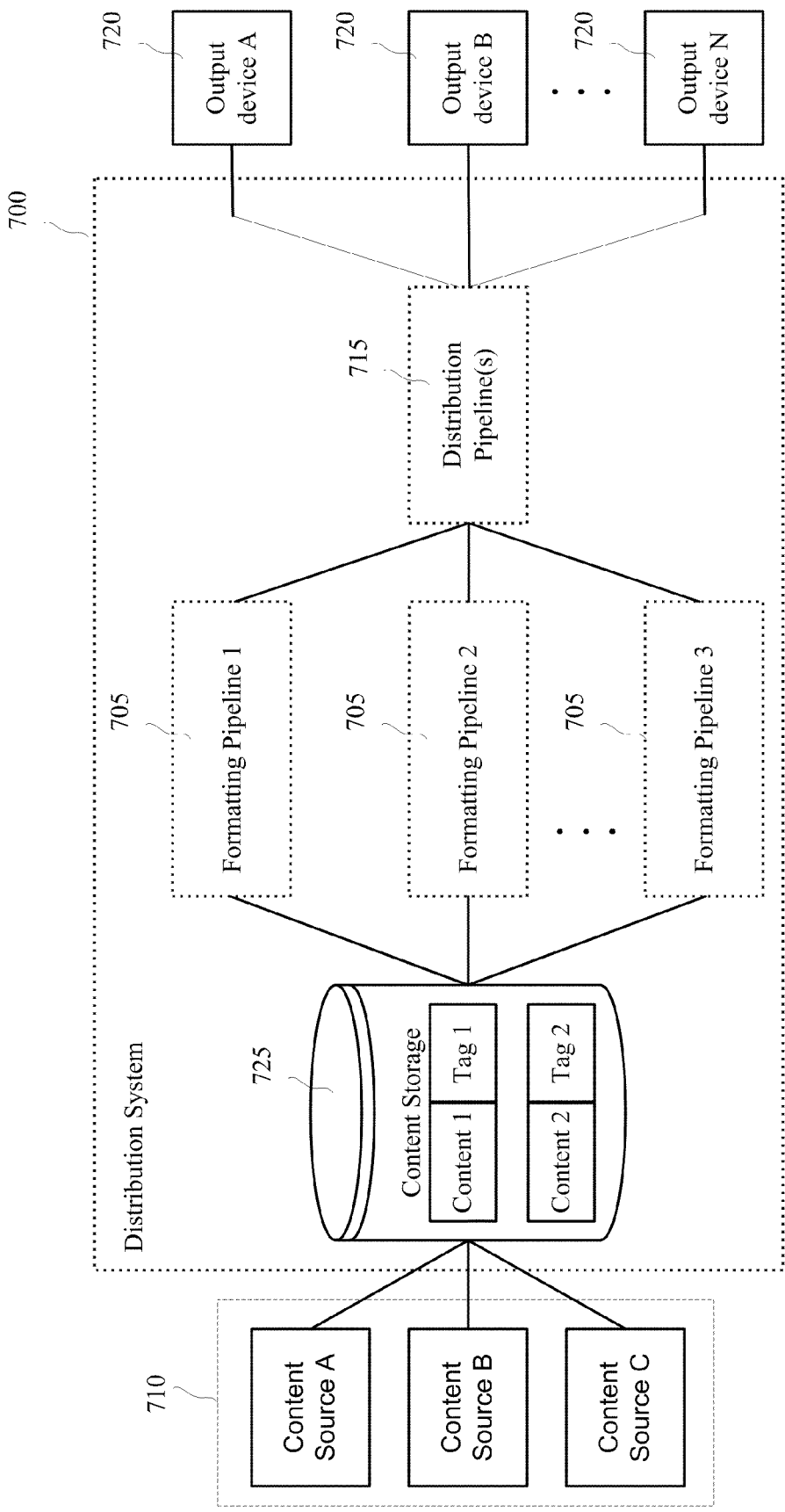
FIG. 7 illustrates one example of a content distribution system that distributes content to various different destinations.

The formatting pipeline 500 can be used in a content distribution system that distributes content to various different destinations. FIG. 7 illustrates one example of such a distribution system 700. The distribution system 700 uses several formatting pipelines (with one being similar to formatting pipeline 500) to perform proper color match operations when exporting one piece of content to various different destinations 720. As shown in FIG. 7, the distribution system includes a content storage 725, one or more distribution pipelines 715, and several color formatting pipelines 705.

The content storage 725 stores various pieces of content that have been tagged with metadata relating to their source color regions and perhaps relating to other type of data relevant for performing color-region transforms (e.g., light condition data). In some embodiments, the content storage is one conceptual storage that is formed by several different storages (e.g., databases) that are at one or more locations. In other embodiments, the content storage 725 is one physical storage (e.g., one database) or is several storages at one physical location. The content storage receives tagged content from a variety of content sources 710, as shown in FIG. 7. These sources include media editing applications, such as application 330 of FIG. 3, that tag generated content.

Each formatting pipeline 705 takes content from the content storage 725 and performs transformation operations to match the video format of the source content data with the video format for a different type of output destination 720 for this content. When the content has been defined for a source color region that is different than a destination's color region, the formatting pipeline 705 for the destination performs a color match operation (such as the one described above by reference to FIG. 5) to transform the content from the source color region to the destination region. As mentioned above, some embodiments so transform the color regions of content in order to preserve the author's intent in generating the content.

As further described above, a formatting pipeline also performs other video formatting operations (e.g., scaling, compositing, etc.) that are necessary to provide video content to a destination in a format that matches the attributes of the destination. When the color regions and other formatting attributes of the source and destination for a piece of content match, the formatting pipelines of the distribution system 700 does not modify the source content and the system distributes the source content as is to its destination.

FIG. 7 illustrates that the distribution system uses one or more distribution pipelines 715 to distribute reformatted or original content to various different destinations. The distribution pipelines include distributing content on distributable media (e.g., CDs, DVDs, etc.), distributing content through a network (e.g., Internet), etc. Moreover, the distribution pipeline of some embodiments distributes various different formats of one piece of content to one output destination that only needs one of the formats. However, this output destination in some embodiments then distributes the other formats of the content to the various other destination devices for the content.

Figure 8:
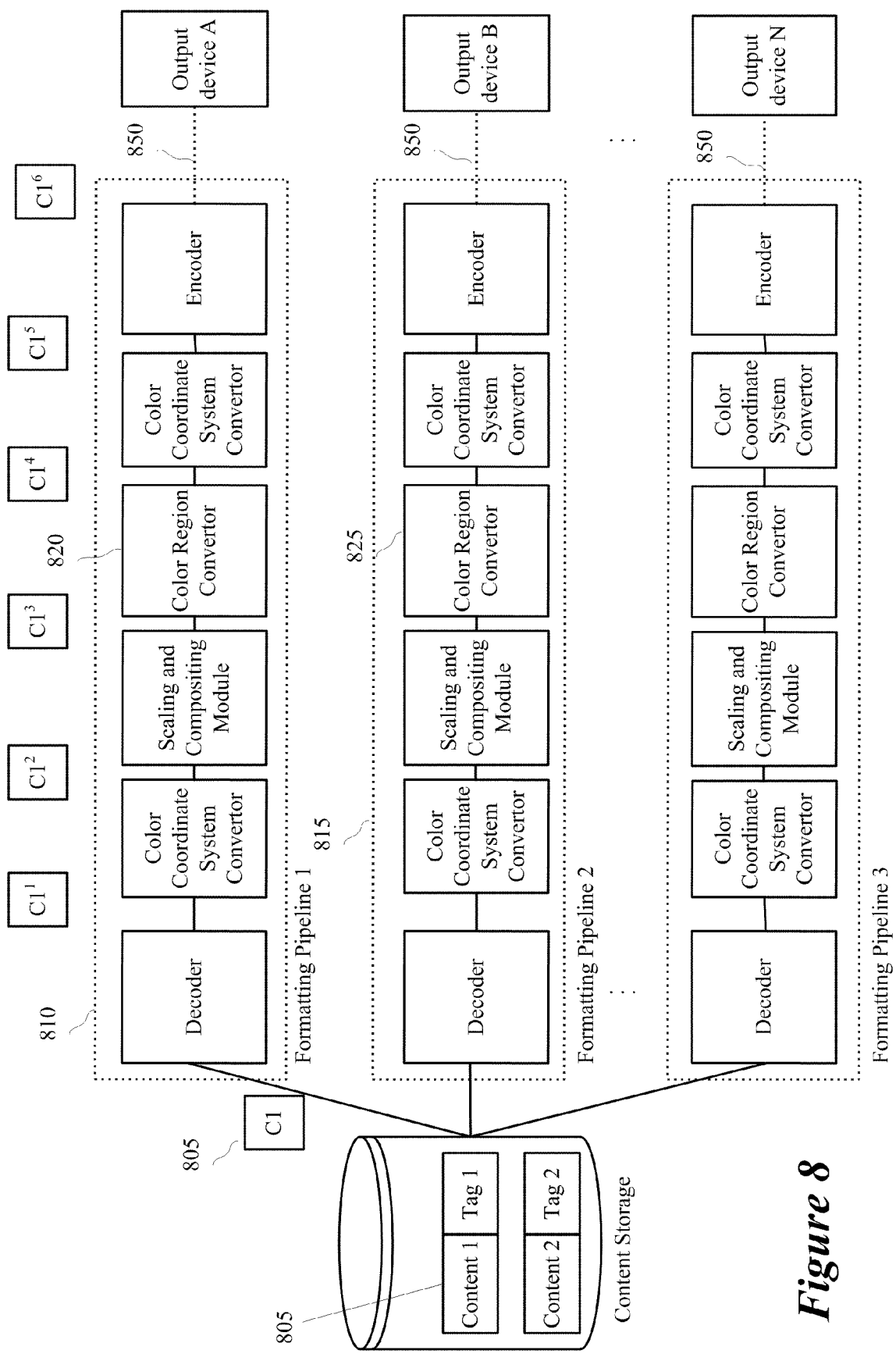
FIG. 8 illustrates the example where rec. 709 high-definition content 805 is passed through a formatting pipeline to format it for a NTSC standard-definition presentation.
Figure 9:
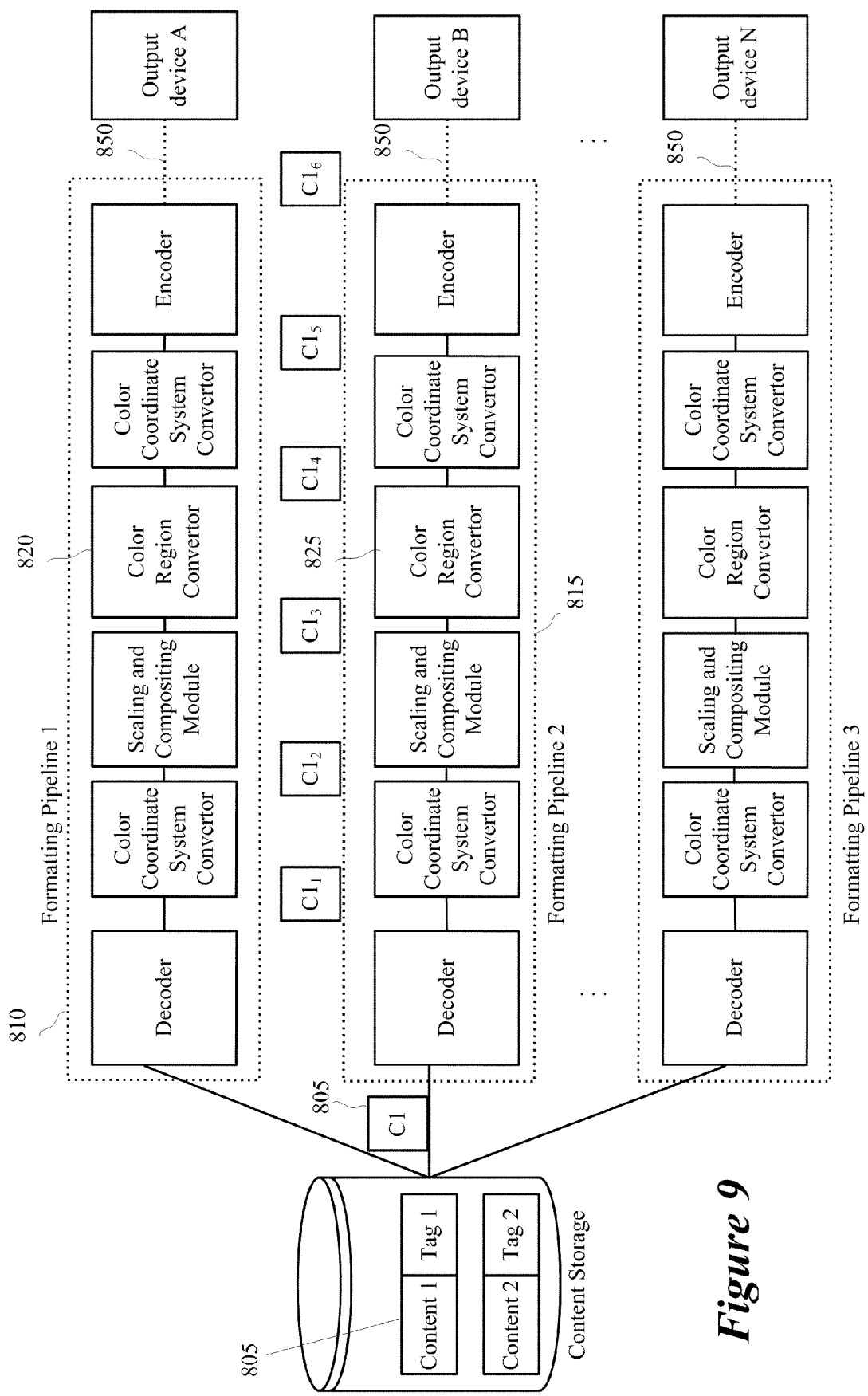
FIG. 9 illustrates the example where rec. 709 high-definition content 805 is passed through a formatting pipeline to format it for a PAL standard-definition presentation.

FIGS. 8 and 9 illustrate an example of how the distribution system 700 of FIG. 7 uses two different formatting pipelines to format one piece of content 805 for two different destinations. As further described below, this transform changes the color of the content 805 from one source color region to two different color regions for the two different destinations.

To simplify this example, the formatting pipelines illustrated in FIGS. 8 and 9 are similar to the formatting pipeline 500 of FIG. 5. Also, to further simplify this example, these two figures have replaced the illustration of the distribution pipeline 715 of FIG. 7 with three dashed lines 850.

FIG. 8 illustrates the example where rec. 709 high-definition content 805 is passed through formatting pipeline 810 to format it for a NTSC standard-definition presentation. In this figure, this content is referred to by the acronym C1, and its different format after each stage in the pipeline is denoted by a different superscript. One of the formatting stages is the color region conversion stage 820 that converts the colors of the content 805 from the rec. 709 color region to the NTSC color region.

FIG. 9 illustrates the example where rec. 709 high-definition content 805 is passed through formatting pipeline 815 to format it for a PAL standard-definition presentation. In this figure, this content is referred to by the acronym C1, and its different format after each stage in the pipeline is denoted by a different subscript. One of the formatting stages is the color region conversion stage 825, which converts the colors of the content 805 from the rec. 709 color region to the PAL color region.

D. Reformatting Process

Figure 10:
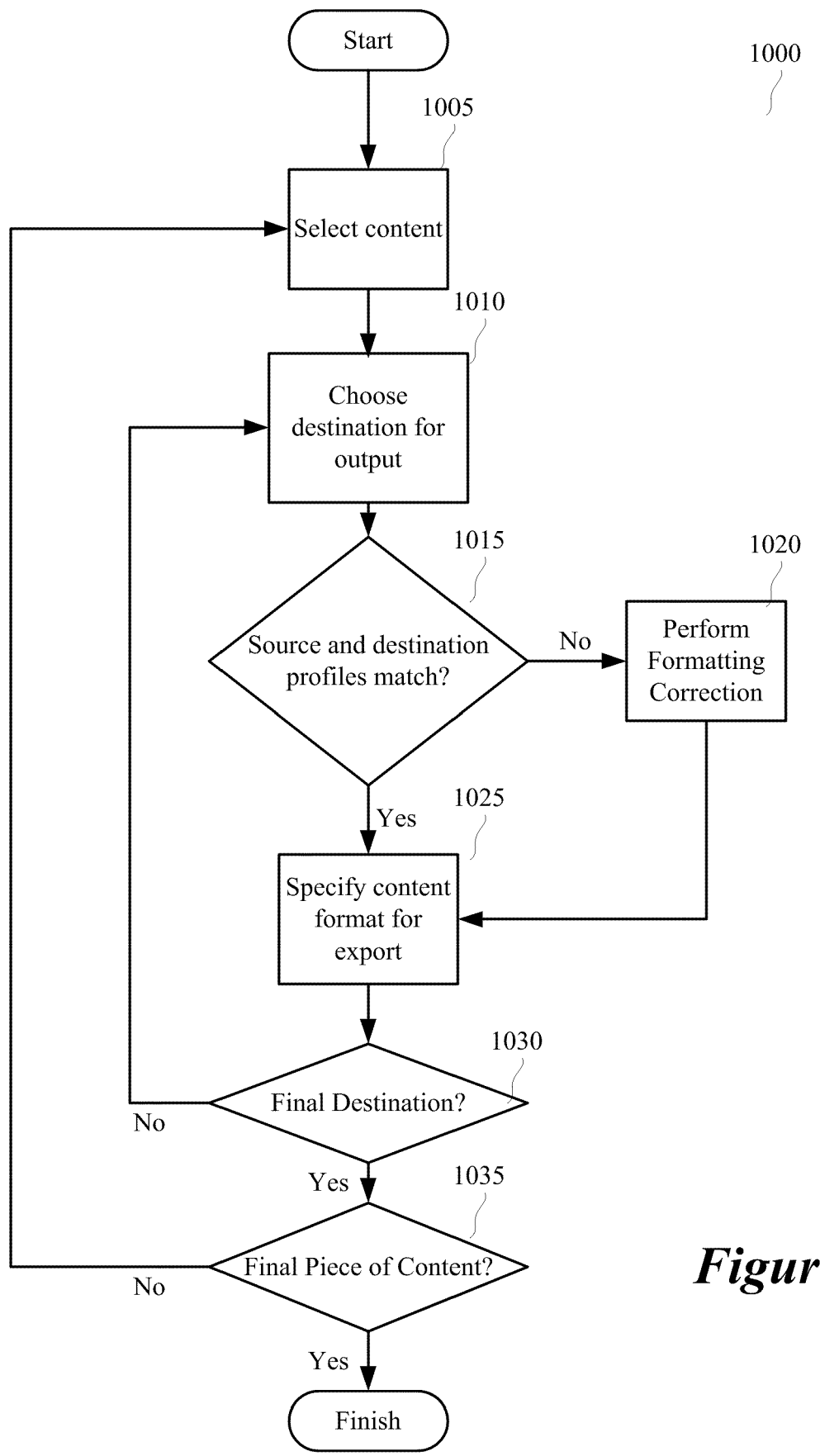
FIG. 10 illustrates a process that a content distribution system performs to reformat content stored in its content storage for various different destinations.

FIG. 10 illustrates a process 1000 that the content distribution system 700 performs to reformat content stored in its content storage 725 for various different destinations. In some embodiments, the distribution system performs this process or part of this process on set intervals (e.g., once a day) or each time it receives new content for distribution. As shown in this figure, the process initially selects (at 1005) one piece of content that has not yet been reformatted for all possible destinations.

Next, the process selects (at 1010) a destination for which the content selected at 1005 has not yet been formatted. The process then determines (at 1015) whether selected content's source profile matches the selected destination's profile. If not, the process performs (at 1020) a process for formatting the selected content for the selected destination's profile. One example of such a process will be described below by reference to FIG. 11. After 1020, the process transitions to 1025.

The process also transitions to 1025 when it determines (at 1015) that the source and destination profiles match. At 1025, the process stores one version of the selected content for the selected destination. When the source and destination profiles match, the stored version of the selected content is the same as the content selected at 1005. However, when the source and destination profiles do not match, the stored version of the selected content is the version that was produced by the formatting operation at 1020.

After 1025, the process determines (at 1030) whether there are any destinations for which it has not yet formatted the content selected at 1005. If so, the process transitions back to 1010 to select another destination for which it has not yet formatted the content and to repeat the operations 1015-1030 again. When the process determines (at 1030) that it has formatted the content selected at 1005 for all destinations, the process transitions to 1035.

At 1035, the process determines whether it has formatted all pieces of content for all possible destinations for the content. If not, the process transitions back to 1005 to select another piece of content which it has not yet formatted for all possible destinations and to repeat the operations 1010-1035 again. When the process determines (at 1035) that it has formatted all pieces of content for all possible destinations, the process ends.

Figure 11:
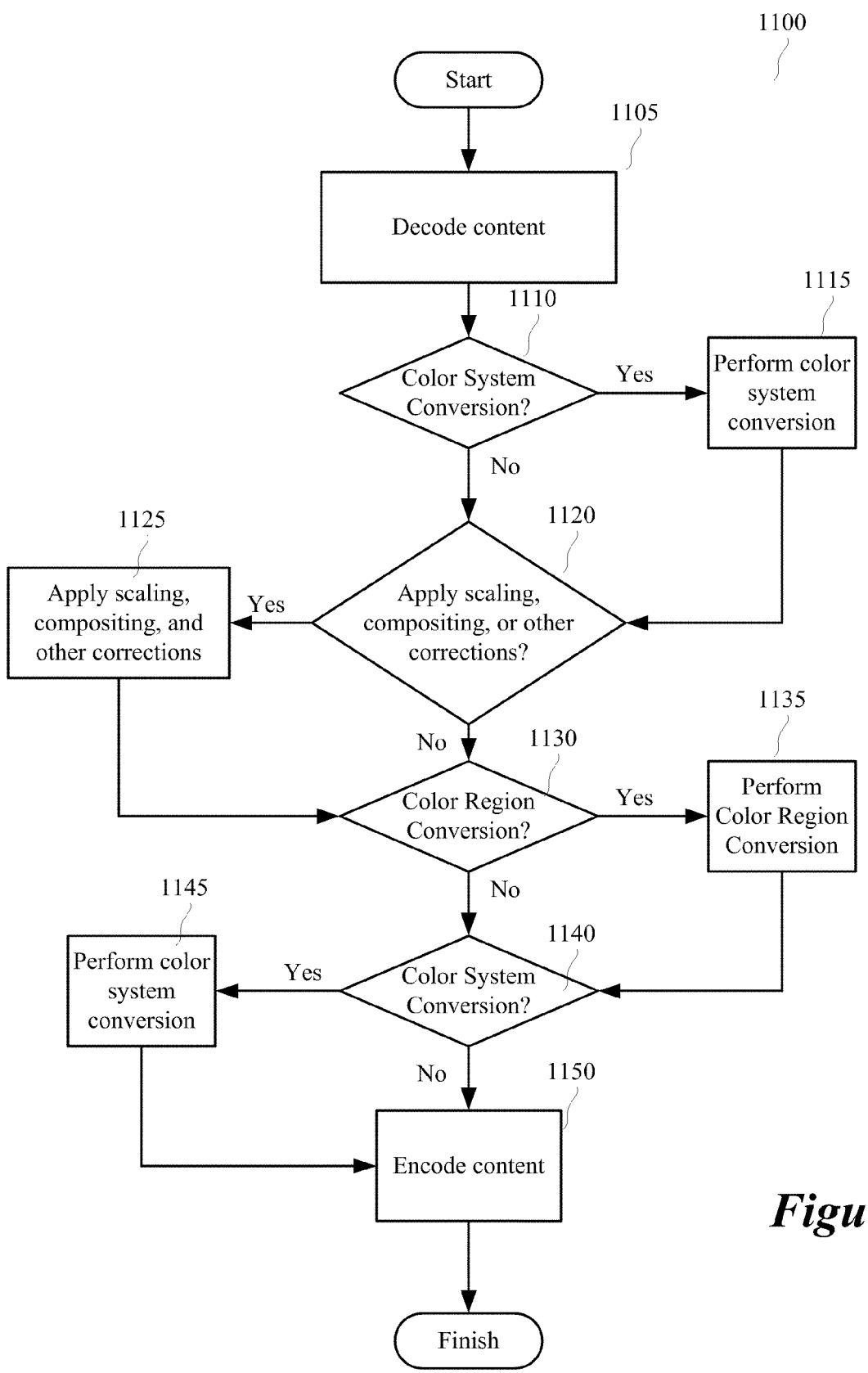
FIG. 11 illustrates a formatting process of some embodiments of the invention.

FIG. 11 illustrates a formatting process 1100 of some embodiments of the invention. In some embodiments, the process 1000 performs the formatting process 1100 each time it does a formatting operation at 1020 to format a particular piece of content from a particular source profile to a particular destination profile. As shown in FIG. 11, the process 1100 initially decodes (at 1105) the content if necessary (i.e., if the content was encoded).

The process 1100 then determines (at 1110) whether the color coordinate systems of the source and destination profiles match. If not, the process performs (at 1115) a color coordinate system transform to change the description of the content from the source color coordinate system to the destination color coordinate system. The process then transitions to 1120.

The process also transitions to 1120 when it determines (at 1110) that the color coordinate systems of the source and destination match. At 1120, the process determines whether it needs (1) to perform scale operation to match the format of the destination, or (2) to perform a composite or other operation on the content. If so, the process performs (at 1125) these operations and then transitions to 1130.

The process also transitions to 1130 when it determines (at 1120) that it does not need to perform scale, composite or other formatting operations. At 1130, the process determines whether it needs to perform a color region conversion to convert the content from a source color region to a destination color region. If so, the process performs (at 1145) a color-region conversion operation and then transitions to 1150.

The process also transitions to 1150 when it determines (at 1140) that it does not need to perform a color-region conversion operation. At 1150, the process encodes the content, and then ends.

III. Real-Time Screen Capture

As mentioned above, another application for the color-region tagging and conversion of some embodiments is for reformatting and display of real-time screen capture. Specifically, some embodiments in real-time (1) associate one or more tags to content that is captured as it is being displayed on a display screen of a device, and (2) use these tags to perform correct color region conversion while reformatting the screen capture for real-time display.

Figure 12:
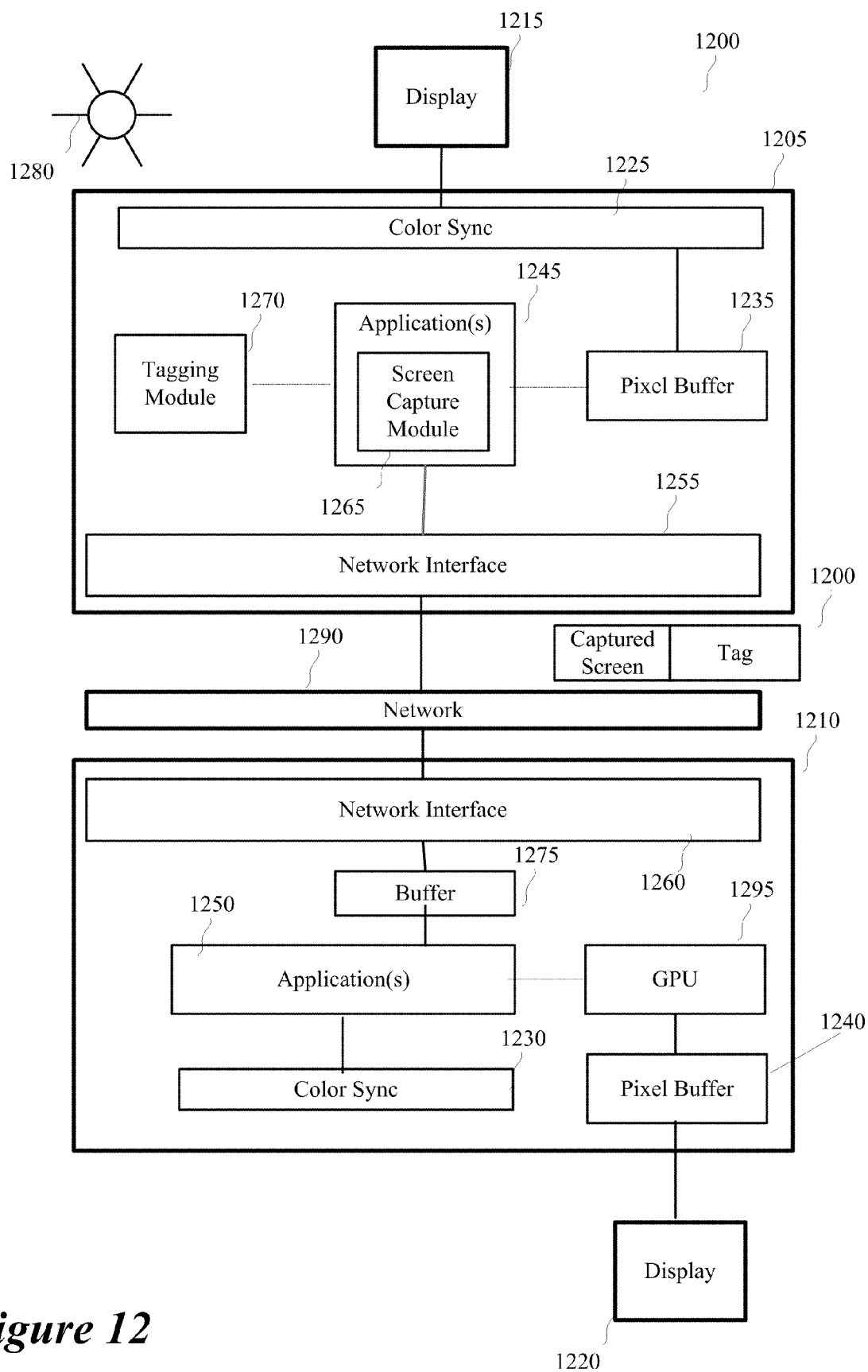
FIG. 12 presents a computing environment that captures content.

To illustrate one such use, FIG. 12 presents a computing environment 1200 that captures such content. As shown in this figure, this environment includes a network 1290 that communicatively couples two computers 1205 and 1210, each with at least one display 1215 or 1220, color sync module 1225 and 1230, a pixel buffer 1235 or 1240, a series of applications 1245 and 1250, and a network interface 1255 or 1260. The computer 1205 also includes a screen capture module 1265 and a tagging module 1270, while the computer 1210 includes buffer 1275 and GPU 1295. This figure also illustrates that the screen capture content is generated in an environment that has a particular ambient light characteristic 1280.

The computer 1205 is a computer on which a first user is performing a series of actions through one or more applications 1245. These applications generate output displays that are initially stored in the pixel buffer 1235. The output displays are then displayed on the display 1215, after they have been color matched for the display by the color sync module 1225.

The application 1245 includes one application that includes or uses a screen capture module for recording the output displays that the computer 1205 displays to the first user. In some embodiments, the screen-capture module is one of the screen capture modules that can be found in the market today. One such screen-capture module is the QT Kit Screen Capture Module® that is provided by the Quicktime® framework of Apple Inc.®

In some embodiments, the screen capture module 1265 captures all frames of data, or a percentage of the frames of data, that are stored in the pixel buffer. This data is stored in the pixel buffer in order to display this data on the display deice 1215. This data is the output display data before color sync 1225 has color matched it to match the color region of the display device 1215. In other embodiments, the screen capture module 1265 captures all the frame data, or a percentage of the frame data, that is stored in a frame buffer that stores the output display after the color matching operation of the color sync 1225.

According to some embodiments of the invention, the screen capture module 1265 tags the captured output displays (collectively referred to below as "captured content") with metadata that specifies the color region of the captured content. To facilitate tagging operations, the computer system 1205 includes the tagging module 1270, as shown in FIG. 12.

The tagging module 1270 is the module that tags the content captured by the screen capture module 1265 with metadata that specifies the color region of the display 1215 on which the output display is presented. As further discussed below, the metadata used in some embodiments includes the ICC profile of the display device 1215 (e.g., use the PROF tag of the device, or the NCLC tag, if available, if a video of the screen-capture is being produced).

In some embodiments, the tagging module only tags the captured content with metadata that specifies the color region of the display device 1215. On the other hand, in conjunction with this metadata, the tagging module of some embodiments also tags the content with data that specifies other conditions that might have affected the color region that the first user perceived while viewing the captured content. The viewer's perception of the color region can be affected by a variety of factors. One such factor is the lighting condition 1280 under which the viewer viewed the captured content. To capture and provide data regarding the lighting conditions 1280, the computer system can includes an intermediary data module (not shown) and a light sensor (not shown). This module and sensor operate to detect lighting conditions 1280, generate data regarding these conditions, and pass this data to the tagging module to tag the content with intermediary tag data. As mentioned above, it is useful to tag such lighting conditions as such conditions affect the user's perception of colors.

The screen capture module 1265 routes each captured and tagged output display (i.e., routes the captured and tagged content) to the computer 1210 through the network interfaces 1255 and 1260 and the network 1290. During the screen capture operation, the captured and tagged output display is continuously stored in the buffer 1275 of the computer 1210.

On the computer 1210, an application that communicates with the screen capture application of the computer 1205 continuously retrieves captured and tagged output display frames from the buffer 1275. As further described below, this application then uses the color sync module 1230 to generate the parameters of the functions that are necessary to perform a color-region conversion on the retrieved display frames. This operation will be further described below by reference to FIG. 14.

The application 1250 then supplies each retrieved display frame along with the color-region transform parameters to the GPU 1295. The GPU then performs the color-region color transform operation on the display frames and stores this result in the pixel buffer 1240. The stored results are then displayed on the display device 1220.

Figure 13:
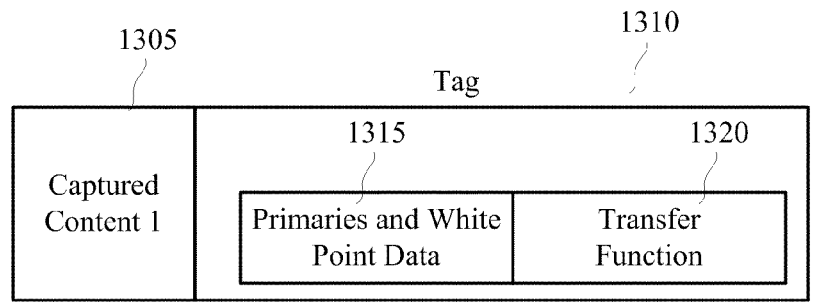
FIG. 13 illustrates one piece of captured content that is tagged with the PROF tag that identifies a display.

In the context of real-time screen capture and display, the tagging module of some embodiments use PROF tags to specify the color region of a display device on which the content is being captured. FIG. 13 illustrates a PROF tag 1310 used by some embodiments of the invention. Specifically, it illustrates one piece of captured content 1305 that is tagged with the PROF tag 1310 that identifies a display. The PROF tag specifies two sets of parameters. One set of parameters 1315 specifies the primary colors of the color gamut (i.e., the three vertices of the gamut triangular region) and the white point of the display device.

Another set of parameters 1320 specifies a transfer function that is used during the color region conversion. As mentioned above, color region conversion is typically performed in linear space. However, the input to the color region conversion is typically non-linear. Accordingly, the inverse of the transfer function is used to convert the input to the color region conversion into linear domain. The input to the color region conversion is the profile of the source color region (e.g., the profile of the display device from which the screen data is captured).

Figure 14:
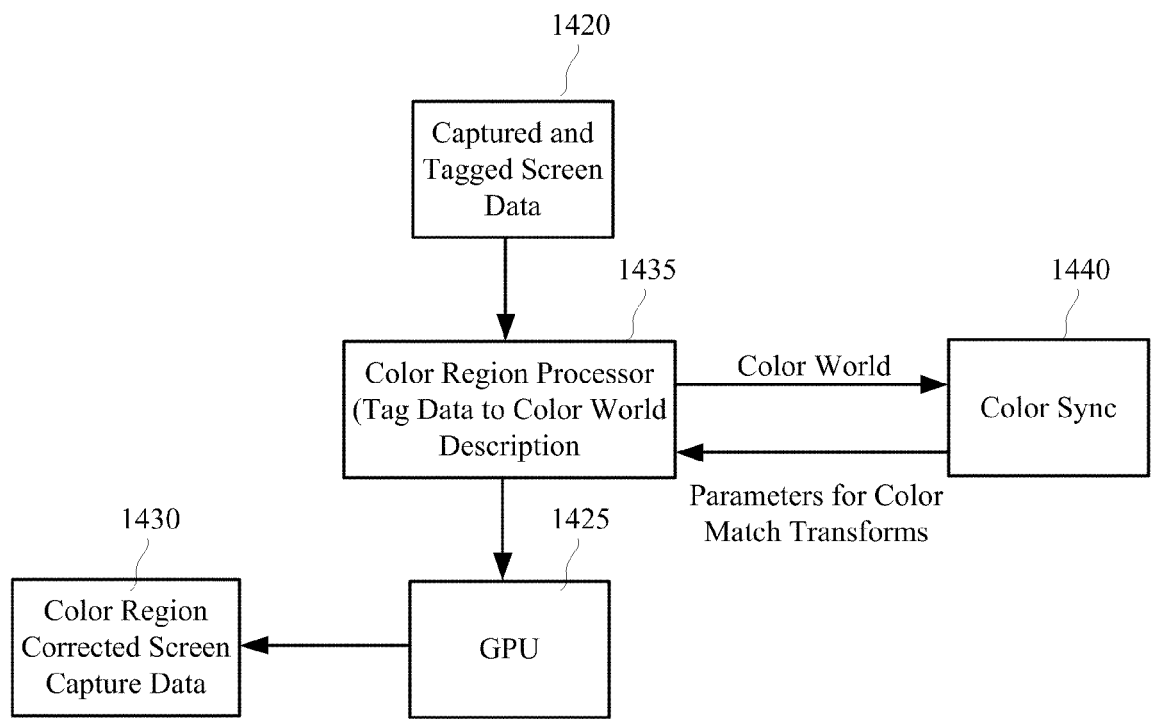
FIG. 14 illustrates the color-region conversion of the screen-capture application of some embodiments in more detail.

FIG. 14 illustrates the color-region conversion of the screen-capture application of some embodiments in more detail. This conversion (1) takes captured frame content defined with respect to one color region of one display device, and (2) produces frame content that is defined for another color region of another display device.

As shown in FIG. 14, the color region conversion is performed in this example by three components, which are a color-region processor 1435, a color sync module 1440, and a GPU 1425. In some embodiments, the captured and tagged screen data 1420 is received one frame at a time. Each frame is tagged in some embodiments with a tag like the tag illustrated in FIG. 13. In other embodiments, each frame is not tagged, but instead is sent at the beginning of a screen capture session (i.e., screen capture operation) or at particular points in the screen capture session.

Also, each frame is typically captured and provided in a color coordinate system (e.g., the RGB space) that is used by both the source display device (e.g., the display device 1215) and the destination display device (e.g., the display device 1220). Accordingly, no color coordinate system conversion is performed in some embodiments to transform the color coordinate system of the captured frames. However, when the color coordinate systems differ, such a transform operation has to be performed.

Also, when the captured frames are captured for a resolution of the source display device that is not supported by the destination display device, a scaling operation has to be performed on the captured frames in order to scale them to a resolution supported by the destination display device. For the example illustrated in FIG. 14, it is assumed that the display device supports the resolution of the captured frame.

The captured and tagged screen data is provided to the color-region processor 1435. The color-region processor 1435 converts the tag data that accompanies the captured frame into a color world description that describes the parameters for performing a color-region transform operation. Specifically, the color world specifies (1) the color region of the source display device (i.e., the source color region), and (2) the color region of the destination display device (i.e., the destination color region). As mentioned above, some embodiments specify the color regions of display devices in terms of the ICC profiles. When the tag data includes intermediary data (e.g., data regarding lighting conditions), the color-region processor 1435 of some embodiments also includes intermediate ICC profiles in the color world description.

As shown in FIG. 14, the color-region processor 1435 provides the color world description to the color sync module 1440. As mentioned above, the color sync module is a color matching framework provided by Apple Inc., in some embodiments. This framework can provide the parameters of the transfer functions that a processor (e.g., a graphics processor) performs on this data to color match this data.

Specifically, in response, the color sync module 1440 returns three sets of parameters for the GPU 1425 to perform the color match operation. The first set of parameters defines a linearization function that is applied to the captured frame to convert it from a non-linear color region definition to a linear color region definition. The second set of parameters specifies the color region conversion transform matrix for applying to the captured frame after the application of the linearization function. At this stage, the color region conversion is not completed as the data is still in the linear domain. According, the third set of parameters specifies a non-linearization function that is applied to the color corrected captured frame data to convert it back to the non-linear domain. As shown in FIG. 14, the GPU uses these parameters to reformat the captured screen data to the color region of the destination display device.

As mentioned above, some embodiments capture the screen data from the pixel buffer 1235 before the color match operation but want the captured screen data to appear exactly as it appears on display 1215. In such cases, the color sync module 1440 performs two color match operations. A first operation to color match the received pixel buffer data to the color region of the source display device 1215, followed by a second color match operation to color match the result of the first color match operation to the color region of the destination display device 1220.

Also, as mentioned above, the color sync module of some embodiments perform the color conversion operation in device-independent X, Y, Z color coordinate system. Accordingly, for such embodiments, the color sync module 1440 returns to the color-region processor additional parameters that specify how the GPU has (1) to transform the RGB pixel buffer data first to the X, Y, Z coordinate system, and (2) to transform the color-region converted X, Y, Z data back to RGB pixel data. As transforms are often expressed in terms of matrix operations and as multiple matrix operations (i.e., multiple matrices) can be combined into a single matrix operation (i.e., a single matrix), the set of parameters for one or both of the device-independent coordinate system transforms can be combined with the set of parameters for one or more of the other transforms returned by color sync module for the color-region conversion operation.

IV. Testing Methodologies

As mentioned above, some embodiments provide new methodology for testing color-region converted content. Some embodiments use existing standard test equipment, while others use new computer-based equipment. Each of these approaches will be further described in the following two sub-sections.

A. Adapting SMPTE Color Bars

Some embodiments provide novel test methods that use existing standard test equipment with modifications of existing test patterns that are used with such equipment. Such test patterns are commonly provided with content to test the accuracy of color formatting operations that are to be performed on content.

Figure 15:
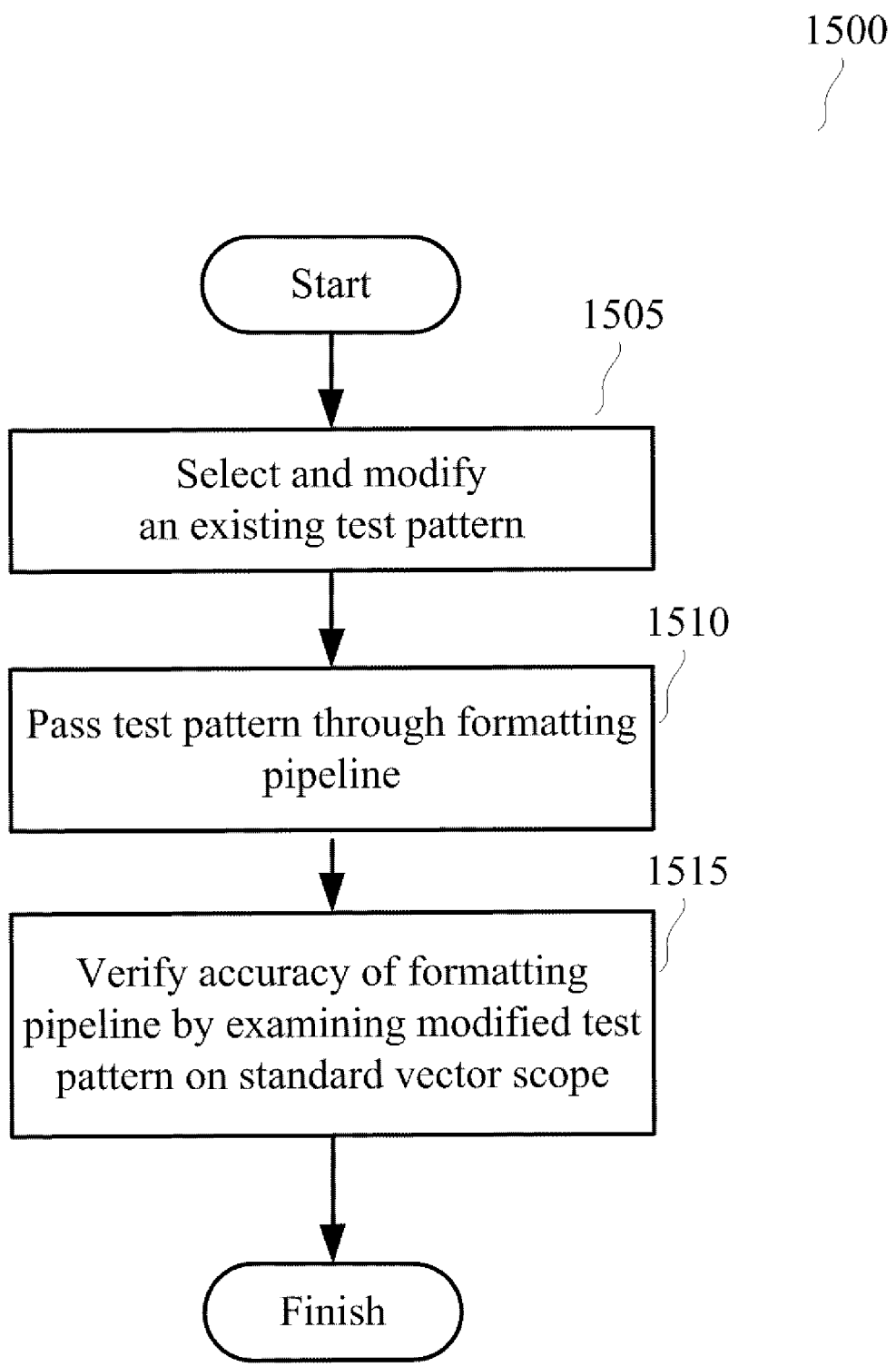
FIG. 15 illustrates a process that some embodiments use to produce a test that can use existing test equipment to verify that color formatting operations will properly transform the color region of the content between a source color region and a destination color region.

FIG. 15 illustrates a process 1500 that some embodiments use to produce a test that can use existing test equipment to verify that color formatting operations will properly transform the color region of the content between a source color region and a destination color region. As shown in this figure, the process 1500 initially selects (at 1505) a test pattern that is used with conventional test equipment to test the viability of content reformatting operations in a first color region.

The method then modifies (at 1510) this test pattern so that it can be used to test the viability of content reformatting operations that are at least partially performed in a second color region. The method then uses (at 1515) this modified test pattern to test the reformatting operation that is performed on content that is defined in the second color region. For instance, in some embodiments, the method uses this modified test pattern to test the accuracy of a content-reformatting operation that reformats content that is initially defined in the first color region to content that is defined in the second color region.

Some embodiments use the process 1500 to modify the SMPTE (Society of Motion Picture and Television Engineers) color bars to produce a color bar pattern that can be used to determine the viability of color formatting operations that transform rec. 709 high definition content to rec. 601 standard definition content in a color correct manner. SMPTE color bars and vector scopes are used today to test whether color reformatting operations on standard or high definition video content causes this content to have colors that do not exist in a color region of a destination.

Figure 16:
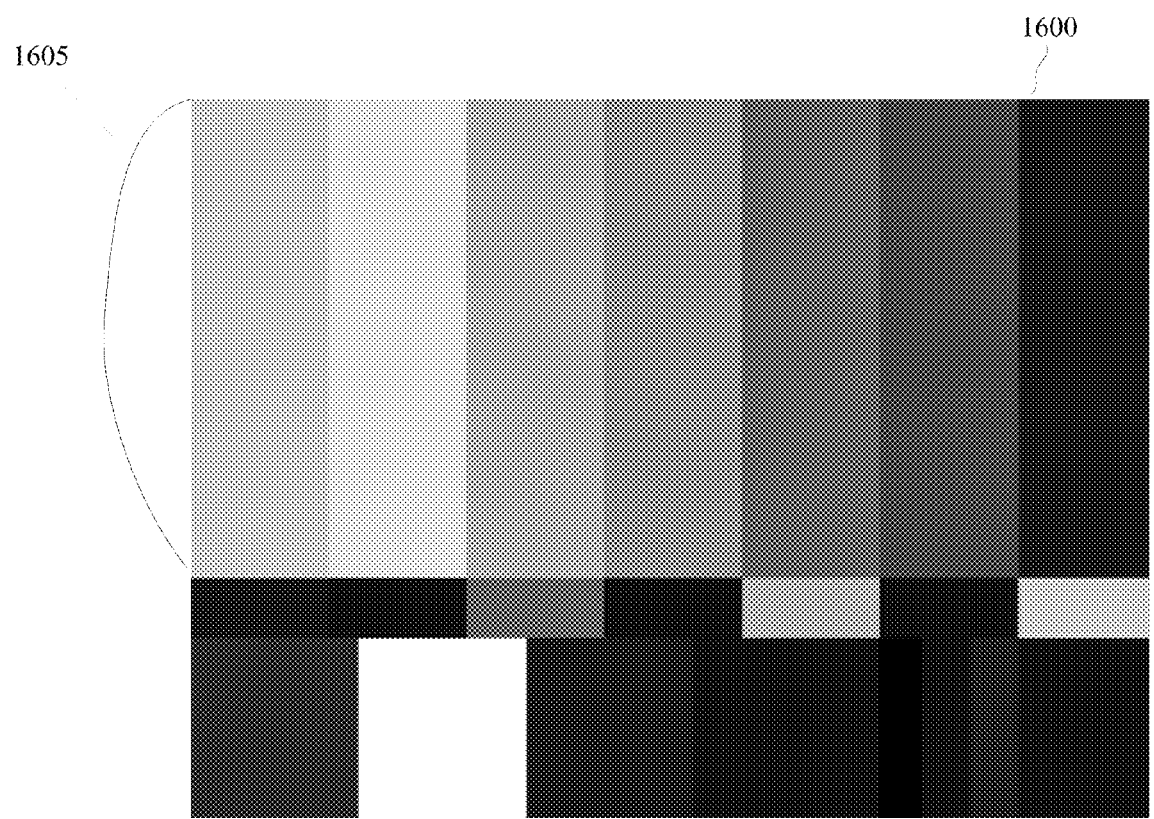
FIG. 16 illustrates a SMPTE color bar test pattern.

FIG. 16 illustrates the SMPTE color bar test pattern 1600. The top portion 1605 of this test pattern is formed by seven vertical color columns. The colors in these columns from left to right are white, yellow, cyan, green, magenta, red, and blue. These colors appear at 75% of their most saturated values. For instance, in an 8-bit space where values range from 0-255, the 75% color bars are as specified as follows: (1) 191, 191, 191 for white, (2) 191, 191, 0 for yellow, (3) 0, 1919, 191 for cyan, (4) 0, 191, 0 for green, (5) 191, 0, 191 for magenta, (6) 191, 0, 0 for red, and (7) 0, 0, 191 for blue.

The test pattern 1600 is routed through the formatting pipeline that is used for reformatting the content (i.e., the same color formatting operations are performed on this color bar and the content). The result of the formatting operations on the color bar is then supplied to a vector scope, which on its display provides an indication of whether the colors in the color bar were appropriately converted during the formatting.

Figure 17:
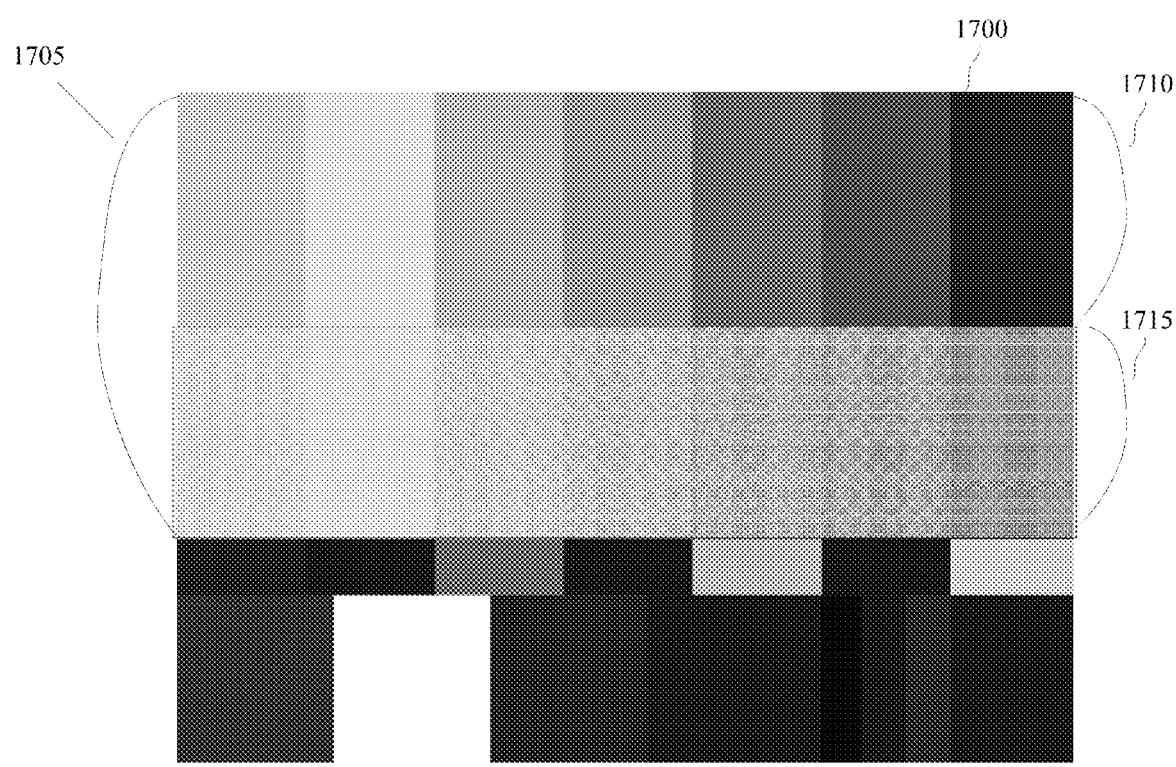
FIG. 17 illustrates a modified SMPTE color bar test pattern that some embodiments produce.

FIG. 17 illustrates a modified SMPTE color bar test pattern 1700 that some embodiments produce to determine the viability of color formatting operations that transform rec. 709 high definition content to rec. 601 standard definition content in a color correct manner. This color bar is similar to the SMPTE color bar except that the vertical color bars 1705 on the top of the modified SMPTE test pattern 1700 are divided into two regions. The first region 1710 shows these color bars like the SMPTE color bar, i.e. it shows seven colors at 75% of their saturated values. Again, for an 8-bit space, the color bars in the region 1710 can be specified as follows: (1) 191, 191, 191 for white, (2) 191, 191, 0 for yellow, (3) 0, 1919, 191 for cyan, (4) 0, 191, 0 for green, (5) 191, 0, 191 for magenta, (6) 191, 0, 0 for red, and (7) 0, 0, 191 for blue.

The second region 1715 shows the same seven colors, but this time their lowest component values are floored at 25% of their maximum values while the highest component values are capped at 75% of their maximum values. For an 8-bit space, this flooring and capping of the color bars can be specified as follows: (1) 191, 191, 191 for white, (2) 191, 191, 64 for yellow, (3) 64, 1919, 191 for cyan, (4) 64, 191, 64 for green, (5) 191, 64, 191 for magenta, (6) 191, 64, 64 for red, and (7) 64, 64, 191 for blue. Some embodiments use this flooring and capping in order to ensure that the colors that are used for the test pattern do not reside on the vertices of the color gamut or near these vertices. These vertices and gamut regions that are near them often get clipped when transforming colors of test patterns and content between two different color regions with two different gamuts. Hence, avoiding using the vertices of the gamut and the regions that are near them prevents the vector scope to falsely detect an error in the color formatting because of clipping of the vertices, which often cannot be avoided when performing transformations between two color domains.

Figure 18:
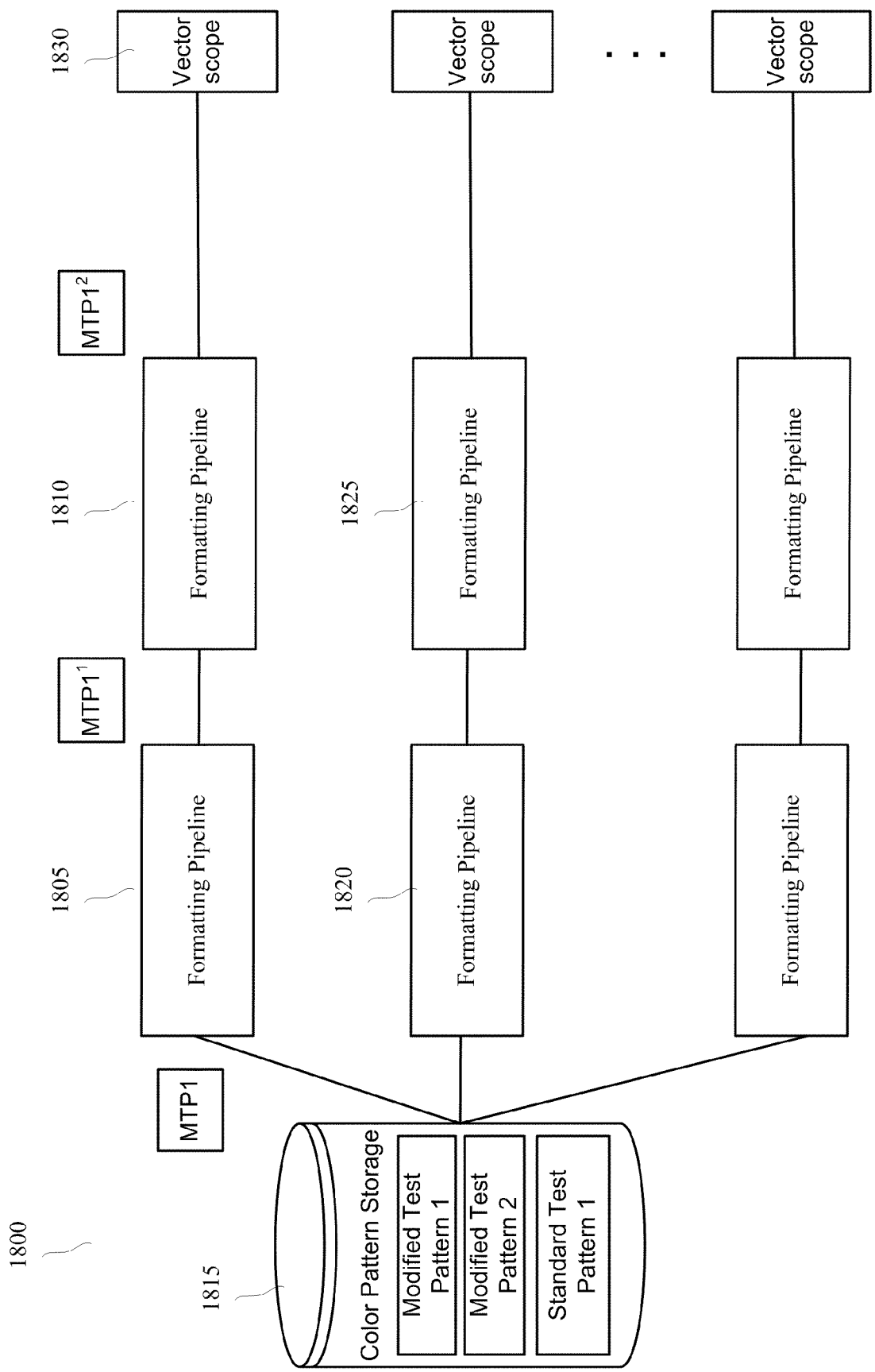
FIG. 18 illustrates a pipeline can be used to reformat rec. 709 high definition content to rec. 601 standard definition content.
Figure 19:
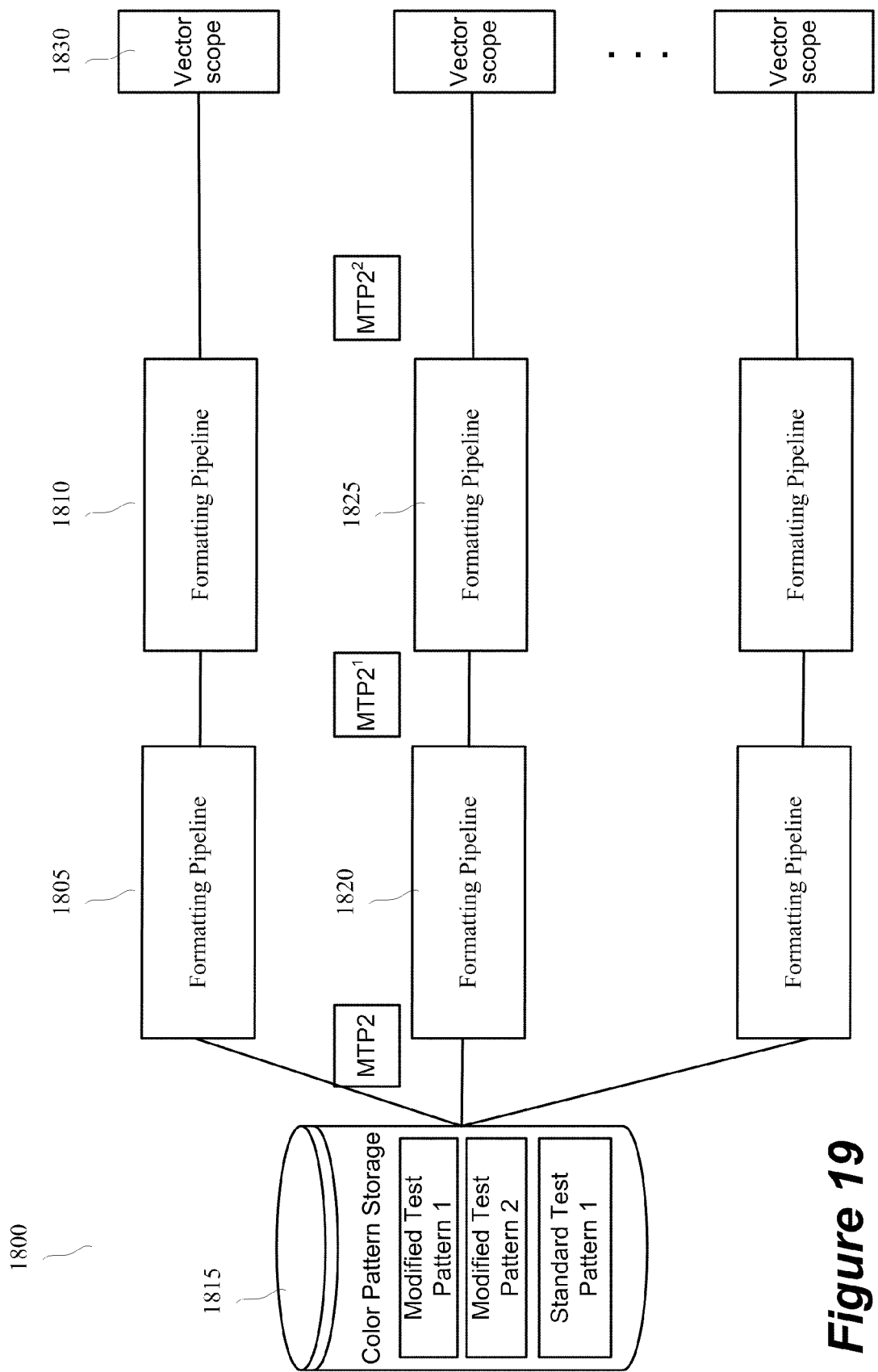
FIG. 19 illustrates a pipeline can be used to reformat rec. 709 high definition content to PAL standard definition content.

FIGS. 18 and 19 illustrate example of how some embodiments use such modified color bar test patterns to test the viability of color formatting operations. Specifically, these figures show a test environment 1800 that test several different formatting pipelines by using one or more test patterns. This environment includes several formatting pipelines 1805, 1810, 1820 and 1825, a test pattern storage 1815, and several vector scopes 1830. The test pattern storage stores multiple test patterns. Some embodiments do not use such storages to store test patterns, but instead extract the test patterns from content that they accompany.

The color formatting pipelines 1805 and 1810 that are similar to the pipelines 810 and 815 that were described above by reference to FIGS. 8 and 9. The pipelines 1805 and 1810 perform formatting operations, which re-format the content from a source format to a destination format. In case of some of the pipelines, the formatting operations include converting the content form one color region to another color region. However, in FIGS. 18 and 19, each of the pipelines 1805 and 1810 is followed by another pipeline 1820 and 1825. These secondary pipelines change the format of the content from the destination format back to the source format. The output of the secondary pipelines is then provided to a standard vector scope that ensures the color conversion accuracy of the formatting pipelines 1805 and 1810.

The pipeline 1805 can be the pipeline that is used in the example illustrated in FIG. 18. This pipeline can be used to reformat rec. 709 high definition content to rec. 601 standard definition content. Accordingly, in the example illustrated in FIG. 18, the modified SMPTE test pattern 1700 is pushed through the pipeline 1805 and 1820. The output of the second pipeline 1820 is then supplied to the vector scope to test that the colors in the test pattern that is output from the secondary pipeline 1820 are within an acceptable threshold of the colors that are in the modified test pattern that is fed into the first pipeline 1805.

The pipeline 1810 can the pipeline that is used in the example illustrated in FIG. 19. This pipeline can be used to reformat rec. 709 high definition content to PAL standard definition content. Accordingly, in the example illustrated in FIG. 19, another modified version 1910 of the SMPTE color bar is pushed through the pipelines 1810 and 1825. The output of the secondary pipeline 1825 is then supplied to the vector scope to test that the colors in the test pattern that is output from the secondary pipeline 1825 are within an acceptable threshold of the colors that are in the modified test pattern that is fed into the first pipeline 1810.

B. Gamut Intersect

Figure 20:
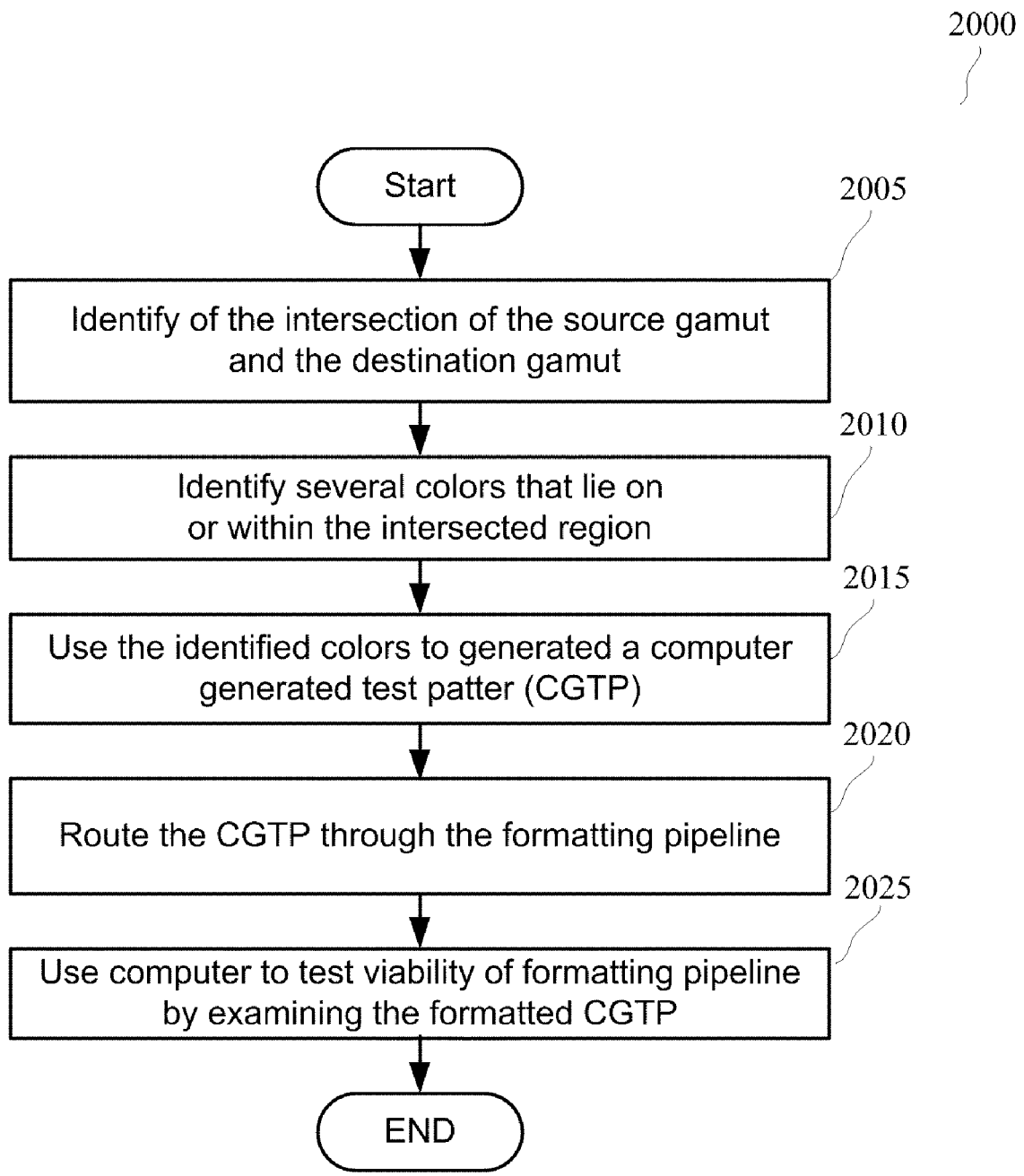
FIGS. 20 and 21 illustrate an embodiment that uses alternative methods for testing the accuracy of formatting operations that reformats content between two different color regions.

Other embodiments use alternative methods for testing the accuracy of formatting operations that reformats content between two different color regions. FIG. 20 illustrates one such alternative method. Specifically, it illustrates a process 2000 that some embodiments use to produce a test pattern for verifying color formatting operations on content when the source color region of the content is different than the color region of the destination of the color formatting pipeline. The process 2000 of FIG. 20 will be described in conjunction with FIG. 21, which provides a pictorial representation of a computer 2100 that performs many of the operations of the process 2000.

Figure 21:
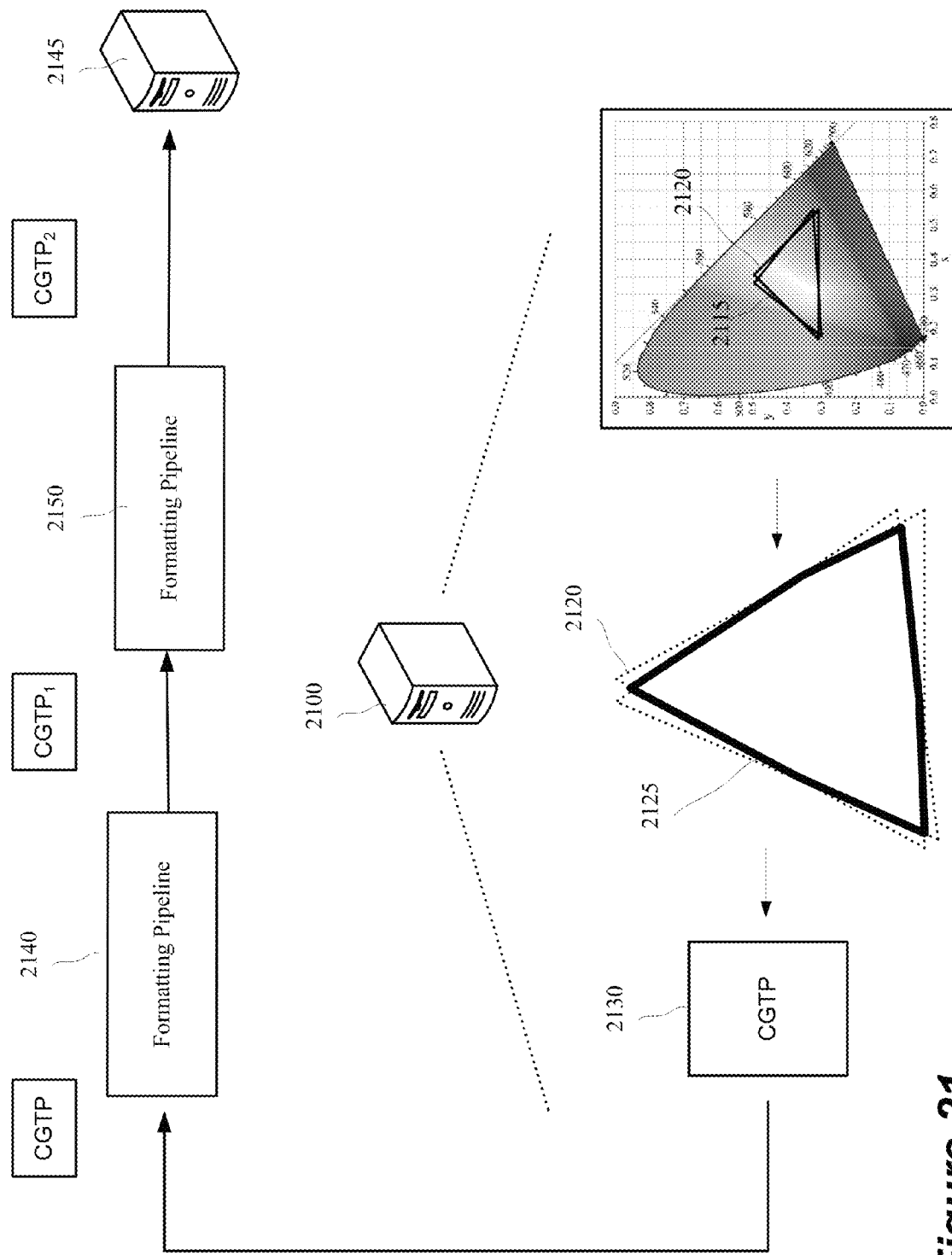

As shown in FIG. 20, the process 2000 initially identifies (at 2005) the intersection of the gamuts that represent the source and destination color regions. FIG. 21 illustrates an example of identifying such an intersection. Specifically, it illustrates two gamuts 2115 and 2120 that represent two different color regions being intersected to produce an intersection 2125.

Figure 22:
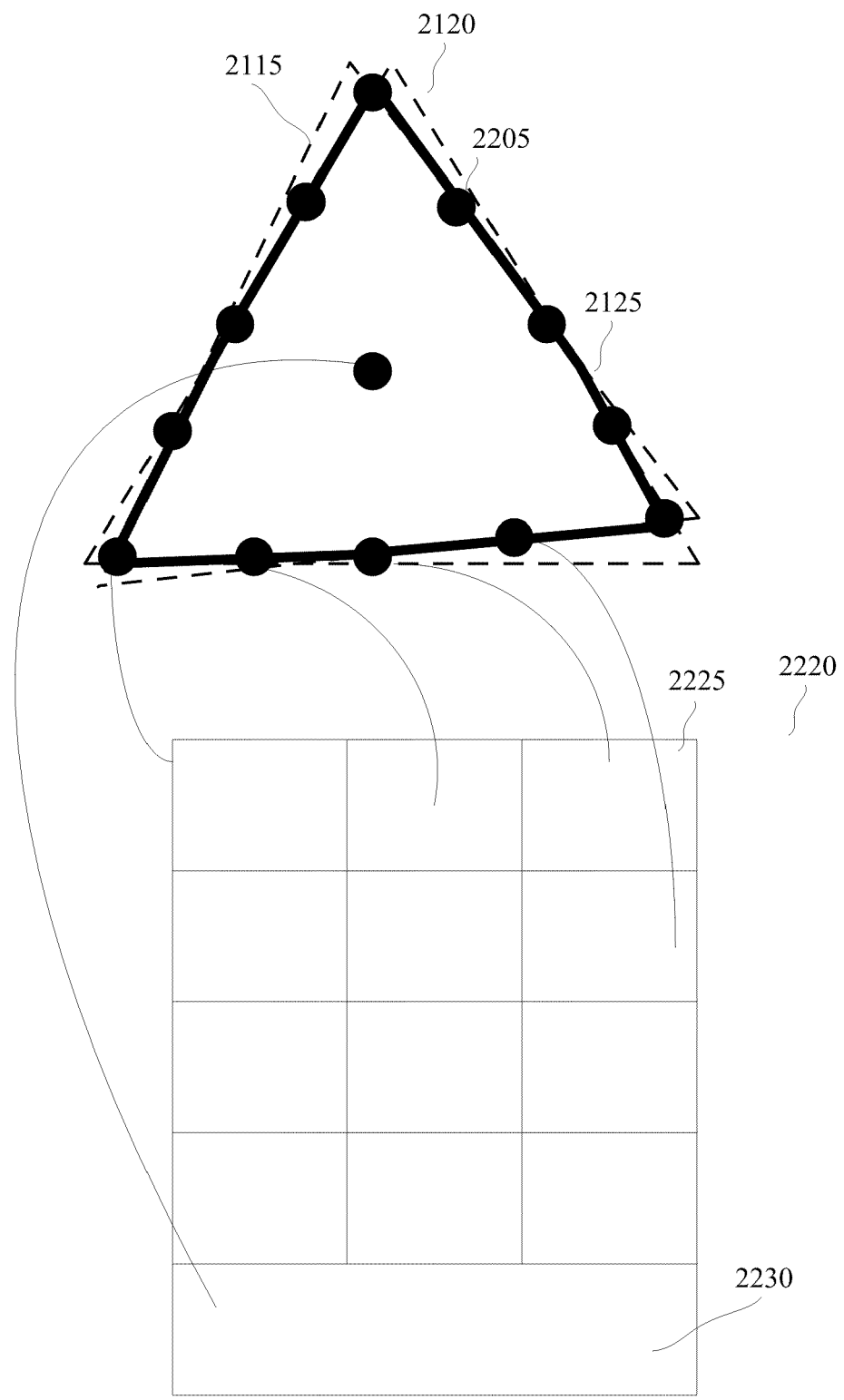
FIG. 22 illustrates one manner for identifying colors that lie on the intersection of two gamuts.

After identifying the intersection of the source and destination gamuts, the process 2000 then identifies (at 2010) several colors that lie on the intersection boundary of the two gamuts, or lie within the intersection boundary of the two gamuts. FIG. 22 illustrates one manner for identifying colors that lie on the identified intersection of two gamuts 2115 and 2120. In this example, twelve equidistant points 2205 are selected on the intersection 2125 along with a white point 2210 inside the boundary of the intersection 2125.

Other embodiments use other techniques for identifying such colors. For instance, some embodiments identify N number of colors by projecting N number of rays from the center of the intersection region at N equal angle offsets. The intersection of these rays with the intersected region (e.g., #625) identifies N points that are the N colors. Also, instead of using the intersection region to identify the colors, some embodiments shrink this boundary by a particular percentage (e.g., 25%) and then use the reduced intersection region to identify colors for the test pattern (e.g., identify N color values on the boundary of the reduced intersection region by selecting equidistant points or using the equal-angle rays).

After identify the colors at 2010, the process then uses (at 2015) these selected colors to generate a color test pattern. The example in FIG. 21 illustrates this by depicting the computer generated test pattern (CGTP) 2130. FIG. 22 also illustrates one manner for generating a test pattern 2220. In this example, the test pattern is generated by using each one of the twelve equidistant points 2205 as a color of a region 2225 of a test pattern 2220. This pattern 2225 also has a region 2230 which is colored by using the white point 2210 of the intersection region 2125.

Once the computer generated test pattern (CGTP) 2130 has been generated, the process 2000 uses (at 2020) this pattern to verify the accuracy of the content-reformatting operations that reformat content between the two different color regions. FIG. 21 conceptually illustrates this by depicting the computer generated test pattern 2130 being routed through a color formatting pipelines 2140 and 2150. The color formatting pipeline 2140 is the pipeline being tested in this example. It changes the format of content from a source profile to a destination profile. The color formatting pipeline 2150, on the other hand, changes the formatting of the content back to the source profile from the destination profile.

As shown in FIG. 21, the output of the formatting pipeline 2150 is then supplied to a computer 2145. The computer then examines (at 2025) the colors in this resulting pattern to determine the viability of the color correction operations performed by the formatting pipeline 2140. After 2025, the process 2000 ends.

V. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 23:
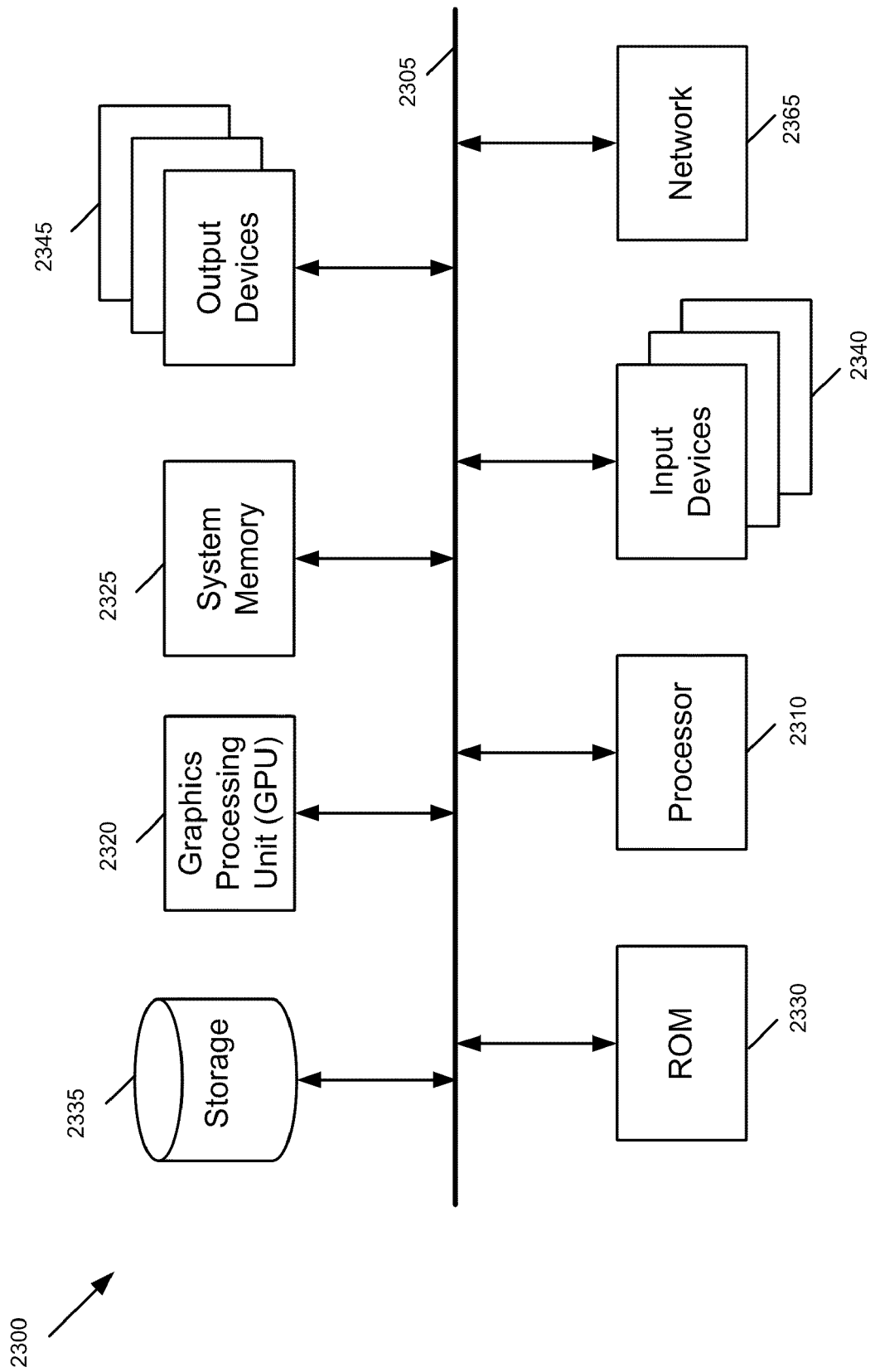
FIG. 23 conceptually illustrates a computer system with which some embodiments of the invention are implemented.

FIG. 23 conceptually illustrates a computer system with which some embodiments of the invention are implemented. Such a computer system includes various types of computer readable media and interfaces for various other types of computer readable media. Computer system 2300 includes a bus 2305, a processor 2310, a graphics processing unit (GPU) 2320, a system memory 2325, a read-only memory 2330, a permanent storage device 2335, input devices 2340, and output devices 2345.

The bus 2305 collectively represents all system, peripheral, and chipset buses that communicatively connect the numerous internal devices of the computer system 2300. For instance, the bus 2305 communicatively connects the processor 2310 with the read-only memory 2330, the GPU 2320, the system memory 2325, and the permanent storage device 2335.

From these various memory units, the processor 2310 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 2320. The GPU 2320 can offload various computations or complement the image processing provided by the processor 2310.

The read-only-memory (ROM) 2330 stores static data and instructions that are needed by the processor 2310 and other modules of the computer system. The permanent storage device 2335, on the other hand, is a read-and-write memory device. This device is a non-volatile memory unit that stores instructions and data even when the computer system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, or ZIP® disk, and its corresponding disk drive) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. For example, the various memory units include instructions for processing multimedia items in accordance with some embodiments. From these various memory units, the processor 2310 retrieves instructions to execute and data to process in order to execute the processes of some embodiments.

The bus 2305 also connects to the input and output devices 2340 and 2345. The input devices enable the user to communicate information and select commands to the computer system. The input devices 2340 include alphanumeric keyboards and pointing devices (also called "cursor control devices"). The output devices 2345 display images generated by the computer system. The output devices include printers and display devices, such as cathode ray tubes (CRT) or liquid crystal displays (LCD).

Finally, as shown in FIG. 23, bus 2305 also couples computer 2300 to a network 2365 through a network adapter (not shown). In this manner, the computer can be a part of a network of computers (such as a local area network ("LAN"), a wide area network ("WAN"), or an Intranet, or a network of networks, such as the internet Any or all components of computer system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. However, some embodiments are implemented as instructions that are implemented as software processes that are specified as a set of instructions sent over a signal carrying medium (e.g., wireless signals, wired download signals, etc.).

VI. Distribution Network

Figure 24:
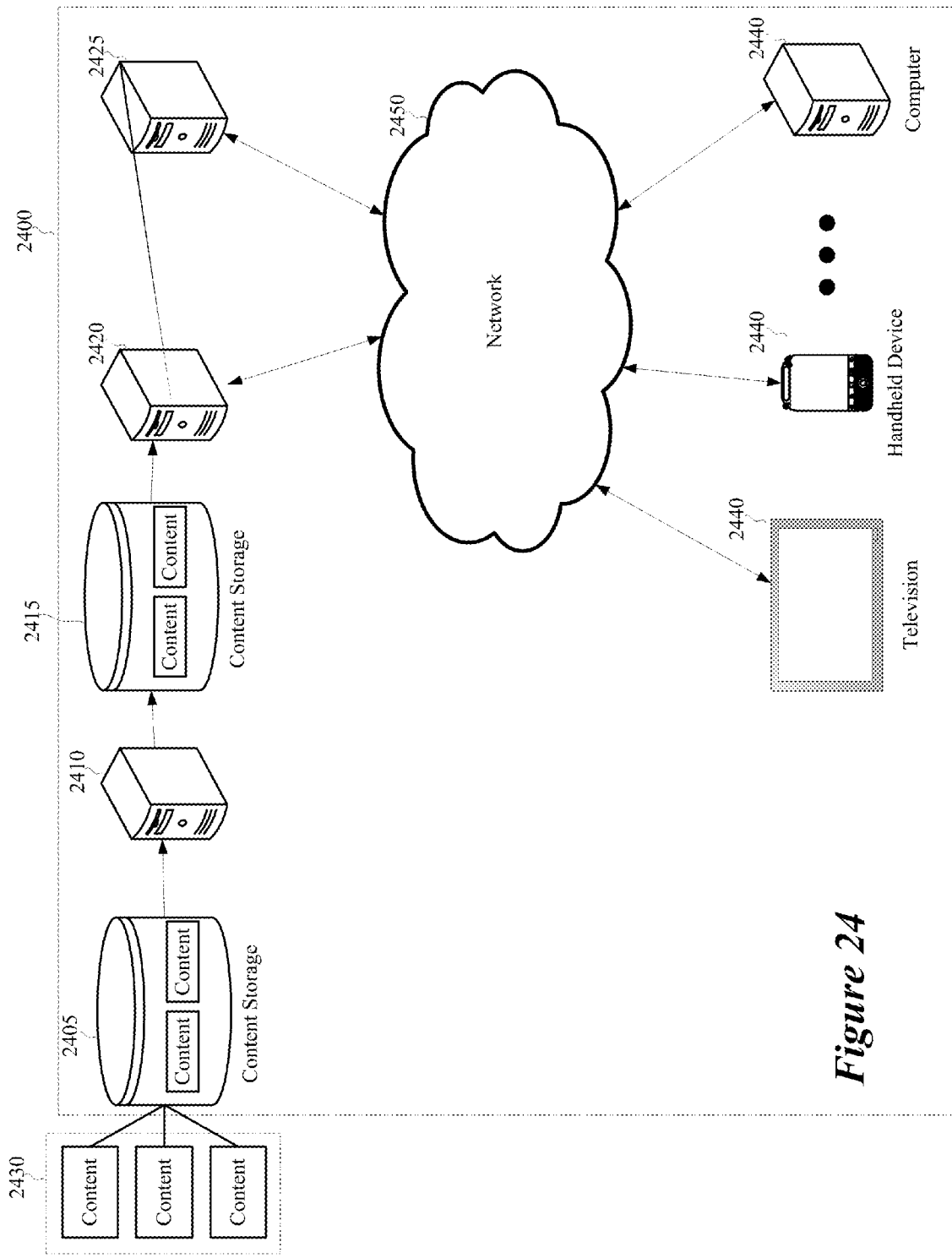
FIG. 24 illustrates a content distribution network that uses the content reformatting modules of some embodiments of the invention.

FIG. 24 illustrates a content distribution network 2400 that uses the content reformatting modules of some embodiments of the invention. This distribution network receives numerous pieces of content from a variety of different content sources, reformats this content for a variety of different destinations, and distributes the content to these designations. As shown in FIG. 24, the network 2400 includes a set of content reception storages 2405, a set of formatting computers 2410, a set of content caching storages 2415, a set of content distribution computers 2420, and a set of transaction computers 2425. Each set of devices (e.g., computers, storages, etc.) can include one device or multiple devices.

As shown in FIG. 24, the set of content reception storages 2405 receives content from a variety of different content sources 2430. Examples of such content include pictures, video clips, audio clip, movies, shows, songs, albums, and other audio, graphical, textual, or video content, etc. In some embodiments, the different content sources 2430 include various different distributors of content, such as movie studios, record labels, TV stations, large and small independent content developers, individuals, etc. Different content sources 2430 distribute their content through different distribution channels, such as through the broadcast, cable, or satellite TV, through distributable media (such as CDs and DVDs), through the Internet or other private or public push or pull data network, etc. Accordingly, content can be received and stored in the content storage 2405 through a variety of different ways.

The set of formatting computers 2410 retrieve content from the set of content storages 2405 and format the content for a variety of different destinations. These formatting computers perform formatting operations like those described above by reference to FIGS. 5, 7, 8 and 9. Accordingly, in some embodiments, one or more such formatting computers 2410 perform the processes described above by reference to FIGS. 10 and 11 and have one or more modules to implement the formatting modules illustrated in FIGS. 5, 7, 8 and 9.

The set of formatting computers 2410 store the output of the formatting modules in the set of content caching storages 2415 (e.g., the process 1000 stores (at 1025) the specified content format for export in the set of content caching storages 2415). These storages are placed at one physical location in some embodiments, while they are placed at multiple locations to facilitate the speed and logistics of content distribution in other embodiments.

The set of content distribution computers 2420 retrieves and distributes content to a variety of different destinations 2440 through one or more different distribution channels, which in FIG. 24 are illustrated as a communication network 2450. For distributing some or all content, some embodiments utilize the set of transaction processing computers 2425, which interact with the destination devices in order to authorize transactions and direct the set of content distribution computers 2420 to distribute content to the destination devices. Examples of such authorization include authorizing financial transactions and authorizing non-financial transactions, which entail authenticating a particular destination or a particular user as one that can receive a particular piece of content.

The content distribution and transaction processing computers 2420 and 2425 can be co-located at one or more facilities, or they can be at various different separate locations. These computers communicate through the communication network 2450 in some embodiments. However, they can communicate through other channels in other embodiments.

In some embodiments, the communication network 2450 is one or more publicly available or private communication network, such as the Internet, a wireless network (e.g., a cellular network), a broadcast network, a satellite network, or any other network of networks. Instead of, or in conjunction with the communication network 2450, some embodiments use other channels for distributing content.

A variety of devices receive the content from the set of content distribution computers 2420, as shown in FIG. 24. Examples of such devices include computers, televisions, satellite and cable settop boxes, handheld devices (e.g., phones, media players, personal digital assistants), etc. The color region reformatting operations of some embodiments of the invention allows the colors of one piece of content to be reformatted for each type of device based on the device's color region, which thereby allows the piece of content to be displayed on each device in a manner that best maintains the content creators or editors intent.

While the invention has been described with reference to numerous specific details, one of ordinary skill in the art will recognize that the invention can be embodied in other specific forms without departing from the spirit of the invention. For instance, multiple different operations are described above by reference to multiple different transforms. As some transforms are often implemented by matrices and multiple matrices can be combined into a single matrix, one of ordinary skill will realize that the several different transforms that are described separately above can be combined into a single transform that performs all their associated functionality. Thus, one of ordinary skill in the art would understand that the invention is not to be limited by the foregoing illustrative details, but rather is to be defined by the appended claims.

I claim:

1. A non-transitory computer readable medium storing a computer program that when executed by at least one processing unit distributes content, the computer program comprising sets of instructions for:

receiving content that is defined with respect to a first color region and is tagged with data identifying the first color region;

using the tagged data to identify the first color region as the color region for which the content is defined; and converting the content from the first color region to a second color region that is the color region of a destination for distributing the content, wherein the first and second color regions are color regions associated with different display standards.

2. The non-transitory computer readable medium of claim 1, wherein a color region is a subset of color values in a larger set of color values that are available in a color coordinate system.

3. The non-transitory computer readable medium of claim 1,
wherein the content comprises a plurality of pixels with a plurality of associated color values;
wherein the set of instructions for converting the content comprises a set of instructions for performing a transform on the set of color values of each pixel to transform the set of color values from the first color region to the second color region.

4. The non-transitory computer readable medium of claim 1, wherein the content is initially defined in a first color coordinate system, wherein the computer program further comprises a set of instructions for converting the color from the first color coordinate system to a second color coordinate system before converting the content to the second color region.

5. The non-transitory computer readable medium of claim 1, wherein the computer program further comprises a set of instructions for converting the content from the first color region to a third color region that is the color region of another destination for distributing the content.

6. The non-transitory computer readable medium of claim 5, wherein one destination is a first type of device that has a first range of colors for presenting the content and the other destination is a second type of device that has a second range of colors for presenting the content, wherein each range of colors defines the color region of the corresponding device.

7. A non-transitory computer readable medium computer readable medium storing a computer program that when executed by at least one processing unit distributes content, the computer program comprising sets of instructions for:
receiving content that is defined with respect to a first color region and is tagged with data identifying the first color region;
using the tagged data to identify the first color region as the color region for which the content is defined;
converting the content from the first color region to a second color region that is the color region of a first destination for distributing the content; and
converting the content from the first color region to a third color region that is the color region of a second destination for distributing the content, wherein the first destination is a first type of device that has a first range of colors for presenting the content and the second destination is a second type of device that has a second range of colors for presenting the content, wherein each range of colors defines the color region of the corresponding device, wherein both devices are display devices.

8. The non-transitory computer readable medium of claim 6, wherein both devices are output devices.

9. The non-transitory computer readable medium of claim 6, wherein one device is a display device and another device is an output device.

10. The non-transitory computer readable medium of claim 1, wherein the first color region specifies a range of colors that are available to a device that captured the content.

11. The non-transitory computer readable medium of claim 1, wherein the first color region specifies a range of colors that are available to a device that displayed the content as the content was being captured.

12. The non-transitory computer readable medium of claim 1, wherein the first color region specifies a range of colors towards which an author of the content generated the content.

13. A content distribution system, the system comprising:
a first set of storages for storing content that is defined with respect to a first color region; and
a set of computers for producing a plurality of different reformatted versions of the content for a plurality of different destinations, by converting the content from the first color region to a plurality of other color regions that each are the color region of a different type destination for distributing the content.

14. The system of claim 13, wherein one destination is a first type of device that has a first range of colors for presenting the content and the other destination is a second type of device that has a second range of colors for presenting the content, wherein each range of colors defines the color region of the corresponding device.

15. The system of claim 14, wherein at least one device is a display device.

16. The system of claim 14, wherein at least one device is an output device.

17. The system of claim 13, wherein the first color region specifies a range of colors towards which an author of the content generated the content.

18. The system of claim 13 further comprising:
a set of content caching storages for storing the reformatted content; and
a set of content caching computers for distributing the reformatted content to a plurality of different destinations through a distribution network.

19. The system of claim 18, wherein the distribution network is the Internet or a cellular communication network.

20. A non-transitory computer readable medium storing a computer program that is executable by at least one processor, said computer program comprising sets of instructions for:
identifying source and destination color regions for content, each color region specifying a range of colors available for representing the content in a color coordinate system;
identifying a plurality of color values that fall within both source and destination color regions;
generating a test pattern to test viability of color region conversion for converting content from the source color region to the destination color region.

21. The non-transitory computer readable medium of claim 20, wherein the range of colors for each color region is a subset of color values in a larger set of color values that are available in the corresponding color coordinate system.

22. The non-transitory computer readable medium of claim 20, wherein the set of instructions for identifying the plurality of color values comprises sets of instructions for:
identifying the intersection of the source and destination color regions;
selecting color values on the identified intersection.

23. The non-transitory computer readable medium of claim 22, wherein the set of instructions for selecting the color values comprises a set of instructions for selecting color values on the boundary of the identified intersection.

24. The non-transitory computer readable medium of claim 22, wherein the set of instructions for selecting the color values comprises a set of instructions for selecting color values within the identified intersection.

25. The non-transitory computer readable medium of claim 22, wherein the set of instructions for selecting the color values comprises a set of instructions for selecting a plurality of equidistant values on a boundary of the identified intersection.

26. The non-transitory computer readable medium of claim 22, wherein the set of instructions for selecting the color values comprises a set of instructions for selecting a plurality of values on a boundary of the identified intersection, said selected plurality of values corresponding to intersection of equal offset angle rays from a location within the identified intersection and a boundary of the identified intersection.

27. The non-transitory computer readable medium of claim 20, wherein the computer program further comprises a set of instructions for using the generated test pattern to determine the accuracy of a series of operations for performing on a piece of content to convert the content's color region from the source color region to the destination color region.

28. The non-transitory computer readable medium of claim 20,
wherein the set of instructions for identifying the plurality of color comprises a set of instructions for selecting an existing SMPTE color bar test pattern;
wherein the set of instructions for generating the test pattern comprises a set of instructions for modifying the existing SMPTE color bar test pattern to ensure that portions of one color region that will be clipped because of the color region conversion are not included as sample colors on the modified test pattern.

29. The non-transitory computer readable medium of claim 28, wherein the computer program further comprises a set of instructions for using a vector scope to test accuracy of color conversion operations on the modified test pattern, said color conversion operations for performing on the content in order to convert the content from the source color region to the destination color region.

* * * * *